US010713828B2

(12) United States Patent
Hiraga et al.

(10) Patent No.: US 10,713,828 B2
(45) Date of Patent: Jul. 14, 2020

(54) IMAGE PROCESSING DEVICE, IMAGE PROCESSING METHOD, NON-TRANSITORY COMPUTER READABLE RECORDING MEDIUM AND PHOTOGRAPHING ASSIST EQUIPMENT

(71) Applicant: Morpho, Inc., Tokyo (JP)

(72) Inventors: Masaki Hiraga, Tokyo (JP); Shun Hirai, Tokyo (JP); Takeshi Miura, Tokyo (JP); Ryo Ono, Tokyo (JP)

(73) Assignee: MORPHO, INC., Tokyo (JP)

( * ) Notice: Subject to any disclaimer, the term of this patent is extended or adjusted under 35 U.S.C. 154(b) by 56 days.

(21) Appl. No.: 15/422,476

(22) Filed: Feb. 2, 2017

(65) Prior Publication Data

US 2017/0221244 A1 Aug. 3, 2017

(30) Foreign Application Priority Data

Feb. 2, 2016 (JP) .................................. 2016-017918

(51) Int. Cl.
*H04N 5/232* (2006.01)
*G06T 11/60* (2006.01)

(52) U.S. Cl.
CPC .......... *G06T 11/60* (2013.01); *H04N 5/23222* (2013.01); *H04N 5/23238* (2013.01); *H04N 5/23293* (2013.01)

(58) Field of Classification Search
CPC ............................ G06T 11/60; H04N 5/23222; H04N 5/23238; H04N 5/23293
See application file for complete search history.

(56) References Cited

U.S. PATENT DOCUMENTS 6,628,887 B1* 9/2003 Rhodes ............ G08B 13/19619
348/E5.042
2002/0172287 A1* 11/2002 Kim ...................... H04N 5/145
375/240.16

(Continued)

FOREIGN PATENT DOCUMENTS

JP 2000175185 6/2000
JP 2004101762 4/2004

(Continued)

OTHER PUBLICATIONS

Office Action of Korea Counterpart Application, dated Sep. 8, 2017, p. 1-p. 8.

(Continued)

*Primary Examiner* — Jonathan R Messmore
(74) *Attorney, Agent, or Firm* — JCIPRNET

(57) ABSTRACT

An image processing device for stitching a plurality of input images together so as to generate a panoramic composite image is provided. An imaging control section sets a guide for photographing a photographing subject from different imaging directions as a guide information for obtaining a plurality of input images suitable for the image composition. A guide display setting section displays a photographing guide image based on the guide information. A user rotates a camera while checking the guide image and captures the plurality of input images from different imaging directions. An image compositing section stitches the plurality of input images together so as to generate a composite image.

28 Claims, 20 Drawing Sheets

(56) References Cited

U.S. PATENT DOCUMENTS

| | | | |
|---|---|---|---|
| 2013/0141524 A1 | 6/2013 | Karunamuni et al. | |
| 2014/0160233 A1* | 6/2014 | Ishida | H04N 5/2258 348/36 |
| 2015/0062289 A1* | 3/2015 | Yoo | H04N 5/23238 348/36 |
| 2015/0130894 A1* | 5/2015 | Holzer | G06F 3/04842 348/36 |
| 2015/0256754 A1* | 9/2015 | Albury | H04N 5/232 348/208.2 |
| 2016/0100106 A1* | 4/2016 | Shi | H04N 5/23293 348/262 |
| 2016/0112632 A1* | 4/2016 | Du | G06T 7/80 348/36 |
| 2016/0191770 A1* | 6/2016 | Taniguchi | H04N 5/2254 348/374 |
| 2016/0212339 A1* | 7/2016 | Schacht | H04N 5/23219 |
| 2016/0373647 A1* | 12/2016 | Garcia Morate | H04N 5/23222 |

FOREIGN PATENT DOCUMENTS

| | | |
|---|---|---|
| JP | 2004228711 | 8/2004 |
| JP | 2007318490 | 12/2007 |
| JP | 2012105121 | 5/2012 |
| JP | 2014509126 | 4/2014 |
| JP | 2015126243 | 7/2015 |
| KR | 1020100069844 | 6/2010 |
| KR | 1020120088431 | 8/2012 |
| KR | 1020150025167 | 3/2015 |
| TW | 201105122 | 2/2011 |
| TW | M400544 | 3/2011 |
| TW | 201340706 | 10/2013 |
| WO | 2015085589 | 6/2015 |
| WO | 2014/064783 | 9/2016 |

OTHER PUBLICATIONS

Office Action of Taiwan Counterpart Application, dated May 7, 2018, pp. 1-17.

Office Action of Taiwan Counterpart Application, dated Dec. 7, 2018, p. 1-p. 4.

Office Action of Japan Counterpart Application, dated Sep. 17, 2019, p. 1-p. 7.

* cited by examiner

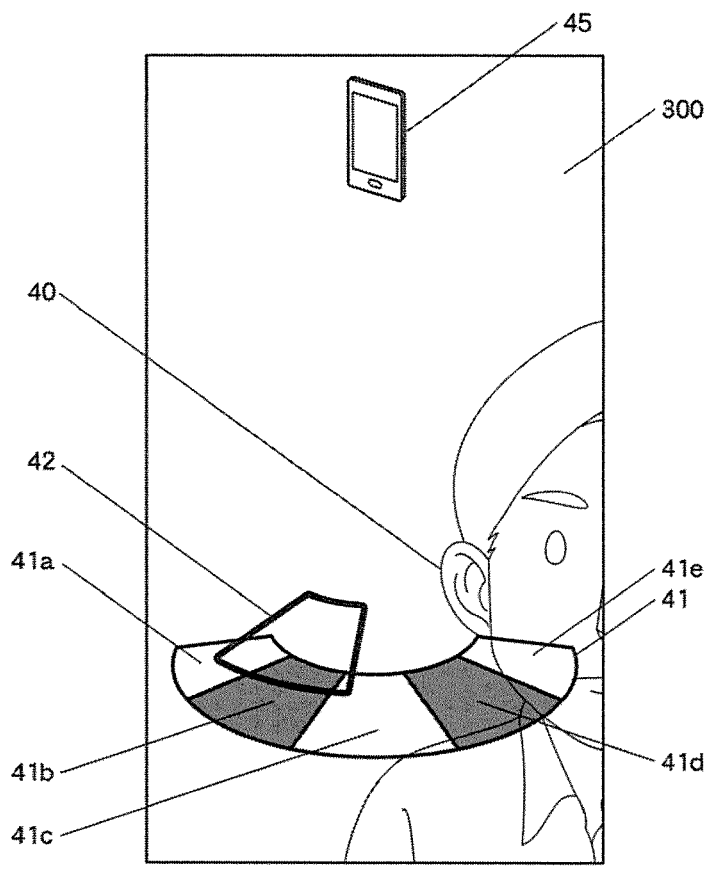
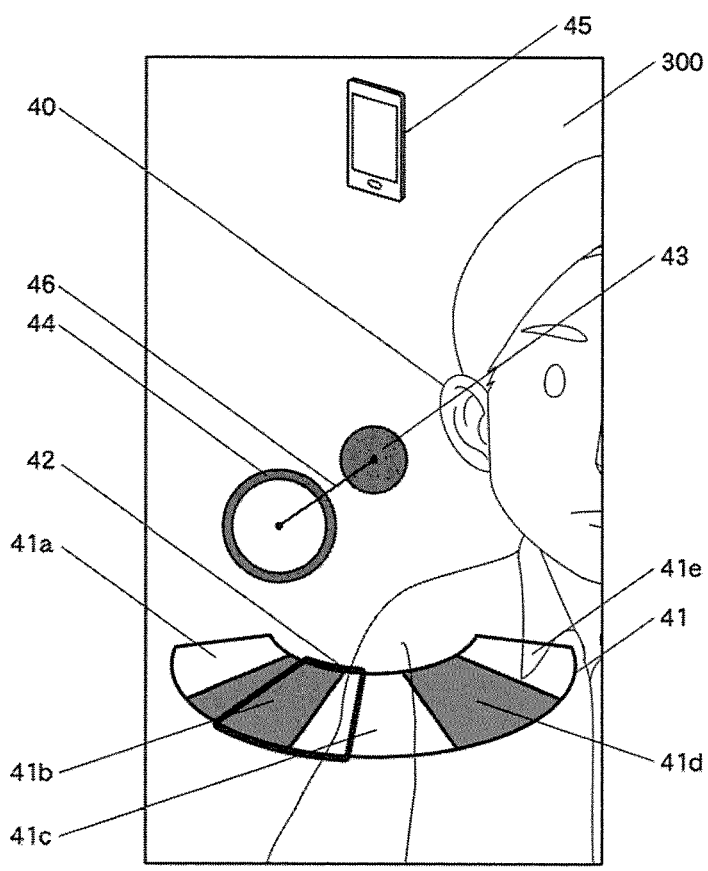

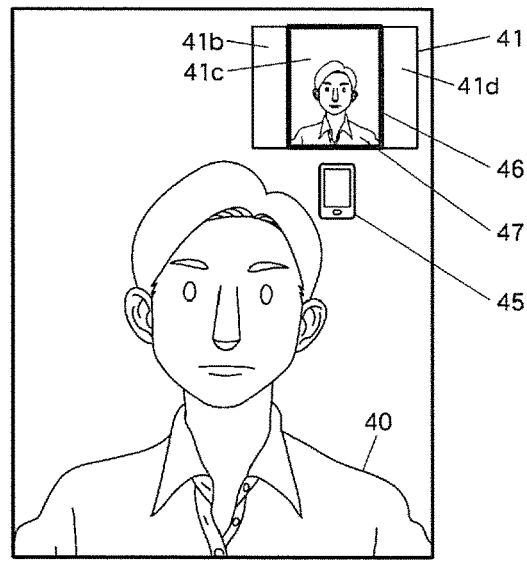
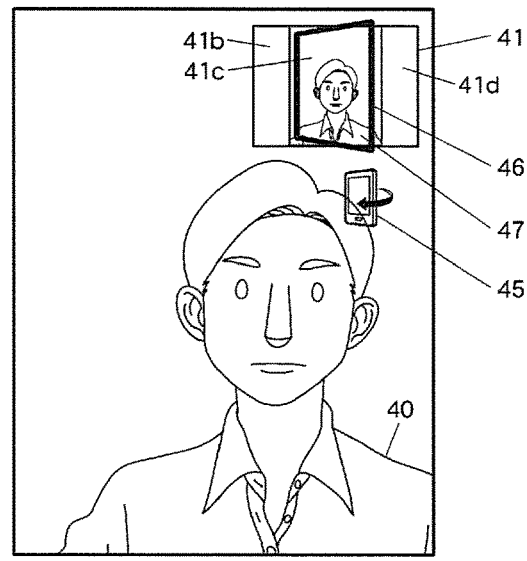
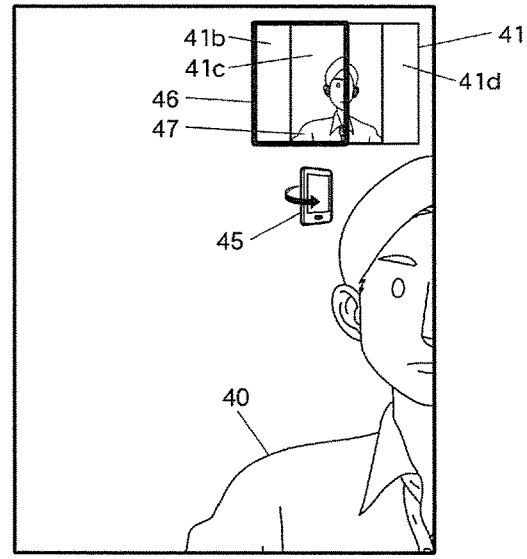

START OF ROTATION

END OF ROTATION

IMAGE PROCESSING DEVICE, IMAGE PROCESSING METHOD, NON-TRANSITORY COMPUTER READABLE RECORDING MEDIUM AND PHOTOGRAPHING ASSIST EQUIPMENT

CROSS-REFERENCE TO RELATED APPLICATIONS

This application claims the priority benefit of Japan Patent application serial no. 2016-17918, filed on Feb. 2, 2016. The entirety of the above-mentioned patent application is hereby incorporated by reference herein and made a part of this specification.

FIELD OF THE INVENTION

The present disclosure relates to an image processing device and the like for generating a wide-angle composite image.

DESCRIPTION OF RELATED ART

Image processing devices that stitch sequentially input images together to generate a panoramic image, which is a single wide-angle composite image, have been known in the art (e.g. see Patent Document 1).

The generation of a panoramic image disclosed in Patent Document 1 is summarized below.

In Patent Document 1, alignment of a target image Ic with a reference image Ir (an image used as a reference of the alignment) is achieved by using a transformation matrix that is estimated on the basis of positional information (three-dimensional coordinate information) on pairs of characteristic points in the reference image Ir and the target image Ic.

As used herein, the term "alignment" refers to processing that determines the position of a predetermined point in the target image Ic relative to the corresponding point in the reference image by searching a position at which the pairs of characteristic points overlap the most.

The movement between the reference image Ir and the target image Ic is regarded as being composed of only a rotational movement of a camera, so that the positional information on the pairs of characteristic points is used to estimate the transformation matrix.

The parameters of the transformation matrix include camera movement (parallel shift in the x and y directions, zoom in/out due to shift in the z direction), camera panning (image distortion in the x and y directions, image rotation in the z axis) and the like, which are determined by means of a convergence calculation using an optimization method. Specifically, the convergence calculation is performed to minimize the value of an objective function that includes the difference between the position (x0, y0, 1) of a characteristic point in the reference image Ir and the transformed position of the position (x1, y1, 1) of the corresponding characteristic point in the target image Ic. The optimization method may be a method known in the art such as Newton's method and the Gauss-Newton method.

When the transformation matrix includes a reduction component caused by a camera movement as described above and the convergence calculation is performed with a priority on minimizing errors, the calculated transformation matrix tends to have a large reduction component since an image with greater reduction provides a relatively smaller error. In such cases, errors are accumulated as each image is sequentially composited. In contrast, when the components of the transformation matrix are limited to rotation components, it is possible to avoid such an accumulation of errors since the reduction component is not captured into account in the convergence calculation that uses an optimization method. Accordingly, a higher quality panoramic image is generated in comparison to a case in which there is no limitation on the rotation components.

CITATION LIST

Patent Literature

Patent Document 1: WO 2014/064783A

SUMMARY OF INVENTION

A problem in capturing a plurality of input images for generating a panoramic image is the difficulty of generating a high-quality panoramic image due to a parallax caused in the photographed images when a user captures the images while moving a camera in the manner of parallel shift (hereinafter referred to as shifting a camera). For example, a panoramic image thus generated may often include unfavorable partial misalignment or distortion.

The parallax caused by a parallel shift of the camera increases as the distance between a subject and the camera decreases. Accordingly, when a user captures his/her own portrait, i.e. a so-called selfie, the problem of parallax becomes prominent. Furthermore, since the subject of selfies is a human face, even a slight misalignment or distortion greatly impairs the quality of the generated panoramic image. Therefore, when a user erroneously shifts a camera in capturing a panoramic selfie, the probability of the quality of a resultant panoramic image being unsatisfactory is high compared to a normal panoramic image.

That is, in order to generate a high-quality panoramic selfie, it is particularly necessary for a user to rotate the camera without shifting it so as to capture a plurality of images of a target subject from different directions.

However, since conventional image processing devices do not have a notification function needed to guide a user to capture images while rotating a camera, it has been highly probable that the user erroneously shifts the camera when capturing images. The user cannot capture images required for generating a high-quality panoramic image and eventually fails at so doing. Therefore, a problem with conventional image processing devices is the difficulty of obtaining a panoramic image with a quality that meets the demands of the user. When a user fails to obtain a panoramic image with a quality that meets his/her demands by using a conventional image processing device, the user is required to capture images again. However, since conventional image processing devices do not have a notification function to notify a user specifically how to move the camera while capturing images, it is highly probable that the user fails again in the same way.

When a user who captures a selfie or a group photo does not know the number of images required to generate a panoramic image, it is possible that he/she stops capturing images before capturing the required number of images or captures an unnecessarily large number of images. Further, another problem is that since the user feels insecure about not knowing either the number of images required or the way of moving a camera, he/she cannot hold the camera stably, which is likely to result in a failure of the photographing.

The present disclosure has been made in view of the above-described problems for guiding a user to capture a plurality of images of a target subject while rotating a camera, so as to obtain input images that are suitable for generating a panoramic image.

In order to solve the above-described problem, the following means are employed. The reference signs in brackets are those used in the description of embodiments and drawings described later. They are added for the purpose of reference, and the components of the present disclosure are not limited to those represented by the reference signs.

A first disclosure is
an image processing device, comprising:
a display device (display section 300) configured to display a photographing subject;
an imaging device (imaging section 500) configured to photograph the photographing subject;
a guide display control unit (imaging control section 150, guide display setting section 180) configured to display a guide on the displaying device, for photographing the photographing subject from different imaging directions; and
an image compositing unit (image compositing section 160) configured to stitch a plurality of images obtained by photographing the photographing subject from the different imaging directions so as to generate a composite image.

A second disclosure may be
the image processing device according to the first disclosure,
wherein the guide indicates rotating the imaging device to photograph the photographing subject from different imaging directions.

A third disclosure may be
the image processing device according to the second disclosure, further comprising:
a first detecting unit (motion sensor 760) configured to detect a rotational direction and a degree of rotation of the imaging device,
wherein the guide display control unit (imaging control section 150, guide display setting section 180) changes a display manner of the guide according to the rotational direction and the degree of rotation of the imaging device.

A fourth disclosure may be
the image processing device according to the third disclosure, wherein the guide comprises a first image (rotation guide 41) indicating a total imaging area that is an area to be photographed into the plurality of images for generating the composite image.

A fifth disclosure may be
the image processing device according to the fourth disclosure, wherein the first image (rotation guide 41) indicates the number of the plurality of images required to photograph the total imaging area.

A sixth disclosure may be
the image processing device according to the fourth disclosure,
wherein the guide further comprises a second image (rotation marker 42) indicating a current imaging area, and
the guide display control unit (imaging control section 150, guide display setting section 180) changes a location of the second image (rotation marker 42) relative to the first image (rotation guide 41) according to the rotational direction and the degree of rotation of the imaging device.

A seventh disclosure may be
the image processing device according to the sixth disclosure, wherein the location of the second image (rotation marker 42) relative to the first image (rotation guide 41) indicates the imaging direction with reference to the imaging device.

A eighth disclosure may be
the image processing device according to the fourth disclosure,
wherein the guide further comprises a reduced image (reduced image 47) of a photographed image, and
the guide display control unit (imaging control section 150, guide display setting section 180) changes a location of the reduced image relative to the first image (rotation guide 41) according to the rotational direction and the degree of rotation of the imaging device.

A ninth disclosure may be
the image processing device according to the sixth disclosure, wherein the location of the second image (marker 51) relative to the first image (rotation guide 41') indicates the imaging direction with reference to a user.

A tenth disclosure may be
the image processing device according to the sixth disclosure, wherein when the location of the second image (rotation marker 42, marker 51) relative to the first image (rotation guide 41, rotation guide 41') indicates the imaging direction, an image displayed on the display device when indicating the imaging angle with reference to the imaging device and an image displayed on the display device when indicating the imaging angle with reference to the user are horizontally flipped images of each other.

A eleventh disclosure may be
the image processing device according to the sixth disclosure,
wherein the first image (rotation guide 41) is sectioned into a plurality of blocks (rotation guide units 41a to 41e) that corresponds to the respective plurality of images required to photograph the total imaging area, and the location of the second image (rotation marker 42) over any one of the blocks indicates the imaging direction.

A twelfth disclosure may be
the image processing device according to the tenth disclosure,
wherein the first image (rotation guide 41) indicates a photographing order corresponding to the plurality of blocks (rotation guide units 41a to 41e) with respect to each of the plurality of blocks.

A thirteenth disclosure may be
the image processing device according to the fourth disclosure, further comprising:
a face area detecting unit configured to detect a face area of a person displayed on the display device,
wherein the guide display control unit sets the first image (rotation guide 41) so that the total imaging area is centered on the face area detected by the face detecting unit.

A fourteenth disclosure may be
the image processing device according to the fourth disclosure, further comprising:
a face area detecting unit configured to detect a face area of a person displayed on the display device,
wherein when the face area detecting unit detects a plurality of face areas, the guide display control unit sets the first image (rotation guide 41) so that the total imaging area is centered on one of the detected plurality of face areas.

A fifteenth disclosure may be
the image processing device according to the fourth disclosure, further comprising:
a face area detecting unit configured to detect a face area of a person displayed on the display device, wherein when the face area detecting unit detects a plurality of face areas, the guide display control unit sets the first image (rotation guide 41) so that the total imaging area includes at least face areas at both ends among the detected plurality of face areas.

A sixteenth disclosure may be the image processing device according to the third disclosure, wherein the imaging device includes a first imaging device (front camera 62) that photographs an image from a same direction as a facing direction of the display device (display section 300, display screen 63) and a second imaging device (rear camera 72) that photographs an image from an opposite direction to the facing direction of the display device (display section 300, display screen 63) and is configured such that the user can select an imaging device to be used from among the first imaging device (front camera 62) and the second imaging device (rear camera 72), and the display manner of the guide changes according to the selected imaging device to be used.

A seventeenth disclosure may be the image processing device according to the fourth disclosure, wherein the imaging device includes a first imaging device (front camera 62) that photographs an image from a same direction as a facing direction of the display device (display section 300, display screen 63) and a second imaging device (rear camera 72) that photographs an image from an opposite direction to the facing direction of the display device (display section 300, display screen 63) and is configured such that the user can select an imaging device to be used from among the first imaging device (front camera 62) and the second imaging device (rear camera 72), and the total imaging area includes an imaging area of the first imaging device (front camera 62) and an imaging area of the second imaging device (rear camera 72).

A eighteenth disclosure may be the image processing device according to the third disclosure, further comprising:

a face area detecting unit configured to detect a face area of a person displayed on the display device, wherein the guide display control unit sets a display location of the guide based on the face area detected by the face area detecting unit.

A nineteenth disclosure may be the image processing device according to the third disclosure, wherein the guide display control unit displays the guide near a first imaging device (front camera 62) that photographs an image from the same direction as a facing direction of the display device (display section 300, display screen 63).

A twentieth disclosure may be the image processing device according to the third disclosure, wherein the guide display control unit displays the guide at a higher visibility than the photographing subject until the imaging device is rotated by a predetermined degree of rotation.

A twenty first disclosure may be the image processing device according to the third disclosure, further comprising:

a second detecting unit (motion sensor 760) configured to detect a direction and an amount of a parallel shift of the imaging device, wherein the guide display control unit (imaging control section 150, guide display setting section 180) changes the display manner of the guide according to the direction and the amount of the parallel shift of the imaging device.

A twenty second disclosure may be the image processing device according to the third disclosure, further comprising:

a supplementary guide display control unit (imaging control section 150, guide display setting section 180) configured to display a supplementary guide (center guide 43, center marker 44) for reducing a change in a photographing position on the display device.

A twenty third disclosure may be the image processing device according to the twenty second disclosure, further comprising:

a second detecting unit (motion sensor 760) configured to detect a direction and an amount of a parallel shift of the imaging device, wherein the guide display control unit (imaging control section 150, guide display setting section 180) changes a display manner of the supplementary guide (center guide 43, center marker 44) according to the direction and the amount of the parallel shift of the imaging device.

A twenty fourth disclosure may be the image processing device according to the twenty third disclosure, wherein the supplementary guide comprises a third image (center guide 43) displayed such that a display location does not change according to the direction and the amount of the parallel shift of the imaging device and a fourth image (center marker 44) displayed such that a display location changes according to the direction and the amount of the parallel shift of the imaging device.

A twenty fifth disclosure is an image processing device, comprising:

a display device (display section 300) configured to display a photographing subject;

an imaging device (imaging section 500) configured to photograph the photographing subject;

a guide display control unit (imaging control section 150, guide display setting section 180) configured to display a guide on the display device, for photographing the photographing subject from different imaging directions; and a communicating unit (communicating section 600) configured to be connectable to an external image compositing device that is provided outside the image processing device, wherein the image compositing device stitches a plurality of images obtained by photographing the photographing subject in the different imaging directions so as to generate a composite image.

A twenty sixth disclosure is an image processing device, comprising:

a communicating unit that is configured to be connectable to an external display device (display section 35) configured to display a photographing subject and an external imaging device (camera 20) configured to photograph the photographing subject, in which the external display device and the external imaging device are provided outside the image processing device;

a guide display control unit (imaging control section 150, guide display setting section 180) configured to display a guide on the display device, for photographing the photographing subject from different imaging directions; and an image compositing unit (image compositing section 160) configured to stitch together a plurality of images obtained by photographing the photographing subject from the different imaging directions so as to generate a composite image.

A twenty seventh disclosure is
a photographing assist equipment, comprising:
a fixing mechanism to which an image processing device is attachable; and
a rotation control mechanism configured to rotate the fixing mechanism,
wherein the image processing device comprises:
a display device configured to display a photographing subject;
an imaging device configured to photograph the photographing subject;
a guide display control unit configured to display a guide on the display device, in which the guide display control unit changes a display manner of the guide according to the rotational direction and the degree of rotation of the imaging device so as to indicate photographing the photographing subject from different imaging directions;
a first detecting unit configured to detect a rotational direction and a degree of rotation of the imaging device; and
an image compositing unit configured to stitch a plurality of images obtained by photographing the photographing subject from the different imaging directions so as to generate a composite image.

A twenty eighth disclosure is
an image processing method, comprising:
a displaying step of displaying a photographing subject on a display device;
a photographing step (A35) of photographing the photographing subject by means of an imaging device;
a guide display controlling step (A15) of displaying a guide on the display device, for photographing the photographing subject from different imaging directions; and
an image compositing step (A55) of stitching a plurality of images obtained by photographing the photographing subject from the different imaging directions so as to generate a composite image.

A twenty ninth disclosure is
a non-transitory computer readable recording medium storing an image processing program, in which the program makes a computer execute the steps of:
a displaying step of displaying a photographing subject on a display device;
a photographing step (A35) of photographing the photographing subject by means of an imaging device;
a guide display controlling step (A15) of displaying a guide on the display device, for photographing the photographing subject from different imaging directions; and
an image compositing step (A55) of stitching a plurality of images obtained by photographing the photographing subject from the different imaging directions so as to generate a composite image.

In photographing a plurality of input images to be used for generating a panoramic image, a guide that corresponds to the direction and the degree to which an imaging device is to be rotated is displayed on a display section of the imaging device as a notification function necessary to guide the user to capture image while rotating the imaging device. This configuration can prevent the user from shifting the camera while capturing images and thereby facilitates images for generating a high quality panoramic image to be captured.

BRIEF DESCRIPTION OF DRAWINGS

FIG. 8(a) and FIG. 8(b) illustrate an example of a photographing guide image displayed on the display section of the smartphone.

FIG. 15(a) to FIG. 15(c) illustrate an example of the rotation guide image displayed on the display section of the smartphone.

DESCRIPTION OF THE EMBODIMENTS

Hereinafter, a preferred embodiment of the present disclosure will be described with reference to the drawings. In the following description, the same reference signs denote the same components, and repeated descriptions may be omitted. The drawings do not necessarily correspond to the description with respect to their dimensions. It should be understood that the embodiments of the present disclosure are not limited to the following embodiment.

1. IMAGE PROCESSING DEVICE

An image processing device according to the embodiment stitches together sequentially-input images every time an image is input, so as to generate a single composite image. For example, the image generating device is suitable for use for real-time stitching together of a plurality of images captured by continuous shooting to generate a panoramic image that is wider than a single photographed image.

For example, the image processing device according to the embodiment can be installed in mobile terminals that have limited resources such as cell-phones or smartphones, digital cameras, tablets and PDAs (personal digital assistants). However, such devices are not limited thereto, and it can also be installed in, for example, general computer systems.

[1-1. Configuration and Principle]

The image processing device of the embodiment has a function of displaying guidance in an imaging stand-by screen. The guidance is to inform the user of the number of images required to obtain a panoramic composite image and to guide the user how to move the camera.

A guided photographing function of the embodiment involves displaying a current location marker representing the current direction and location of the camera and a photographing guide including a photographing direction and location of the camera and the number of images required in the imaging stand-by screen. The user moves the camera to bring the current location marker to the photographing guide and then captures an image.

This function enables the user to readily capture a plurality of images that are required to obtain a good panoramic composite image.

Figure 1:
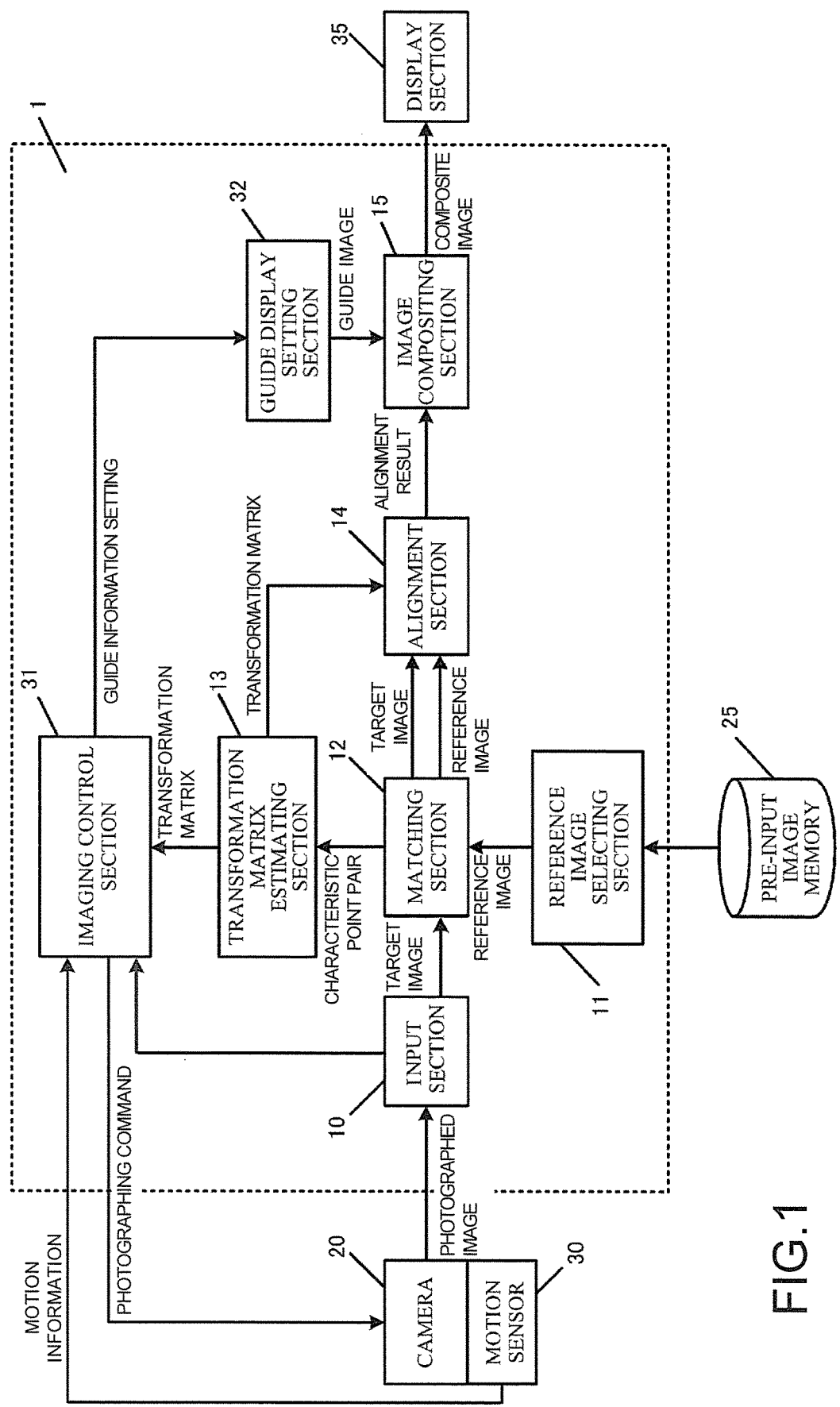
FIG. 1 is a block diagram of an example of the functional configuration of an image processing device.

FIG. 1 is a block diagram of an example of the functional configuration of the image processing device 1 according to the embodiment.

The image processing device 1 includes an input section 10, a reference image selecting section 11, a matching section 12, a transformation matrix estimating section 13, an alignment section 14, an image compositing section 15, an imaging control section 31 and a guide display setting section 32. These sections are functional sections (functional blocks) of a processing unit (processing device) of the image processing device 1, and the processing unit includes processors such as a CPU and a DSP, an integrated circuit such as an ASIC, and the like.

The input section 10 has a function of inputting an image captured by a camera 20 (hereinafter referred to as a "photographed image"). For example, the input section 10 has a function of inputting a photographed image every time the image is captured.

The input section 10 stores a first input image in a first temporary storage area (hereinafter referred to as an "output image buffer"). Further, the input section 10 stores the subsequent sequentially input images in a second temporary storage area (hereinafter referred to as an "input image buffer").

When an image is stored in the second temporary storage area, alignment of the image is carried out, and a determination is made as to whether the image is to be rendered. When it is determined that the image is to be rendered, the output image stored in the first temporary storage area is updated by image composition, and the updated image is overwritten. In the following description, the image stored in the first temporary storage area is referred to as a composite image It, and the image stored in the second temporary storage area is referred to as a target image Ic (input image).

The reference image selecting section 11 has a function of selecting a reference image Ir for alignment. The reference image Ir is used as a reference for aligning the target image Ic. For example, the reference image selecting section 11 references a pre-input image memory 25 in which information on a pre-input image is stored. The pre-input image(s) refers to one or more images that were input by the input section 10(b)efore the target image Ic. That is, when the n-th target image Ic is referred to as Ic (n-1), the pre-input images are referred to as Ic (n-2), Ic (n-3) . . . Ic0. When there is one pre-input image, the reference image selecting section 11 selects the image Ic1 as a reference image Ir0 for a target image Ic2. After this, the reference image selecting section 11 does not change the reference image until a predetermined condition is met.

For example, the predetermined condition may be set such that the distance from the reference image Ir to the target image Ic (n) is equal to or greater than a predetermined value. When the condition is met, the reference image selecting section 11 selects the target image Ic (n) as a reference image Ir (k) for the next new target image Ic (n+1) and stores information on the target image Ic (n) in the pre-input image memory 25. The information on the target image Ic (n) may be composed of, for example, only the pixel values and the positional information of characteristic points obtained by the matching section 12 (described below). Limiting the information to be recorded in the pre-input image memory can reduce the amount of memory used compared to the case in which the reference image Ir itself is stored.

When a target image Ic (n+1) is input, the reference image selecting section 11 references the pre-input image memory 25 and selects the target image Ic (n) as the reference image Ir (k). Subsequently, the reference image selecting section 11 outputs the image information on the reference image Ir (including at least pixel information and positional information of characteristic points) to the matching section 12.

The matching section 12 acquires the correspondence between the reference image Ir and the target image Ic. The matching section 12 acquires information on characteristic points in the reference image Ir and characteristic points in the target image Ic. The matching section 12 acquires the correspondence between the reference image Ir and the target image Ic, for example, based on the pixel values of the characteristic points. The matching can be carried out by a method known in the art such as block matching and a gradient method.

The matching section 12 may convert the reference image Ir and the target image Ic to respective multiresolution images before the matching. For example, the matching section 12 gradually changes the resolution of the reference image Ir and the target image Ic to generate a respective plurality of images with different resolutions. Then, the matching section 12 obtains the amount of parallel shift of the characteristic points between images with the lowest resolution, and carries out the pixel-level matching of the characteristic points between images with a higher resolution. In this case, an improvement in processing speed and a reduction in computing cost can be achieved.

The matching section 12 obtains positional information (coordinate information) of pairs of characteristic points for which the correspondence between the reference image Ir and the target image Ic has been calculated. That is, the matching section 12 obtains the positional information of a certain characteristic point in the reference image Ir and the positional information of the corresponding characteristic point in the target image Ic as a pair. The matching section 12 obtains information on multiple pairs of characteristic points for the alignment processing (described below).

The matching section 12 outputs the obtained pairs of characteristic points to the transformation matrix estimating section 13. As described above, when the reference image selecting section 11 adds the target image Ic as the reference image Ir for the subsequent images, the matching section 12 outputs the pixel values and positional information of the characteristic points in the target image Ic to the reference image selecting section 11.

The transfotitiation matrix estimating section 13 estimates a transformation matrix based on the correspondence between the reference image Ir and the target image Ic output from the matching section 12. The transformation matrix correlates the coordinate system of the reference image Ir with the coordinate system of the target image Ic.

The alignment section 14 carries out aligmnent of the reference image Ir with the target image Ic by using the transformation matrix estimated by the transformation matrix estimating section 13.

When only the first image is input, the input first image is selected as a reference image Ir0. Then, when the second image (target image Ic) is input, the alignment section 14 carries out alignment of the target image Ic with reference to the position of the reference image Ir0.

As used herein, the term "alignment" or "align" means to determine the position of a predetermined point (e.g. the center C1) of the target image Ic relative to a predetermined point (e.g. the center C0) of the reference image Ir0. The alignment section 14 searches for the position where the pairs of characteristic points obtained by the matching section 12 overlap each other the most. Then, when the alignment of the reference image Ir0 and the target image Ic is complete, it is recorded that the positional relationships of each have been linked together (link Re1).

For example, when the centers C0 to C7 of eight input images are linked to each other (links Re1 to Re7), the eight images can be aligned and stitched together by repeating the operation in which the reference image selecting section 11 selects the reference image Ir and the alignment section 14 generates the link.

As described above, when the relative distance from the reference image Ir0 to the target image Ic is equal to or greater than a predetermined value after the alignment section 14 finishes the alignment, it is required that the reference image selecting section 11 adds the target image Ic as the reference image Ir1 for the subsequent images. Accordingly, the matching section 12 outputs the pixel values and the positional information of characteristic points in the target image Ic to the reference image selecting section 11.

The imaging plane of the camera 20 before rotation, which is referred to as the imaging plane S0, and the imaging plane of the camera 20 after the rotation, which is referred to as an imaging plane S1, are not located in the same plane. Accordingly, the aligned position that is obtained by a parallel shift of the characteristic points deviates from the correct aligned position. That is, in consideration of such camera movement, it is necessary to carry out the alignment such that the positions of the characteristic points in the reference image Ir coincide with the positions of the characteristic points in the target image Ic in the same three-dimensional coordinate system.

For this reason, the transformation matrix estimating section 13 estimates a transformation matrix that conforms the three-dimensional coordinate system of the target image Ic with the three-dimensional coordinate system of the reference image Ir0.

The transformation matrix estimating section 13 has a function of assuming that the camera 20 is only rotated (panned) between the reference image Ir and the target image Ic and estimating the transformation equation by using the positional information of the pairs of characteristic points. In the embodiment, the transformation matrix estimating section 13 projects the two-dimensional coordinate of a characteristic point to a sphere in a three-dimensional space Sp so as to estimate the transformation matrix by using the correspondence of the projected coordinates. The transformation matrix estimating section 13 outputs the estimated transformation matrix to the alignment section 14 and the imaging control section 31.

The image compositing section 15 renders a group of images that are aligned with each other by the alignment section 14 on the sphere in the three-dimensional space using the transformation matrix estimated by the transformation matrix estimating section 13 so as to create an image Id, and projects the image Id to a two-dimensional composition plane Sp. Then, the image compositing section 15 outputs the rendered images to the display section 35 as a single composite image and also records it in the output image buffer. The display section 35 displays the image output from the image compositing section 15.

The imaging control section 31 sets guide information. When the user selects a guided selfie photographing mode on an input screen or the like provided in the camera 20, the information on the selection is output to the imaging control section 31 through the input section 10, and the imaging control section 31 starts the guide information setting process.

For example, the imaging control section 31 sets guide information that includes a photographing area (hereinafter referred to as a "panoramic imaging area") that is rendered as a panoramic image, the number of images to be captured (hereinafter referred to as the "number of shots") and a rotation angle of the camera 20 for each photographing (hereinafter referred to as a "unit rotation angle"). Specifically, for example, the panoramic imaging area is set to "150 degrees", the number of shots is set to "five", and the unit rotation angle is set to "30 degrees". The unit rotation angle may be any angle less than the angle of view of the camera 20 (the photographing angle of the camera 20). It is preferred that the respective imaging areas overlap each other by 10 degrees or more.

Based on the panoramic imaging area, the number of shots and the unit rotation angle output from the imaging control section 31, the guide display setting section 32 generates a photographing guide image and displays it in the imaging stand-by screen of the camera 20. The photographing guide image is displayed in such a manner as to notify the user of the way to capture images with the camera 20 while rotating it. Therefore, the user can immediately understand a suitable movement of the camera. Further, by capturing images while rotating the camera 20 according to the notification, the user can capture images that are required for generating a high-quality panoramic image.

A motion sensor 30, which is provided in or attached to the camera 20, detects motion information of the camera 20 when the user moves the camera. The motion sensor 30 includes a sensor unit such as a triaxial accelerometer for detecting acceleration in three dimensions, a triaxial angular velocity sensor (gyro sensor) for detecting angular velocity in three dimensions or an inertial measurement unit (IMU) which is a package of these sensors. The motion sensor 30 detects acceleration and angular velocity as the motion information and outputs the detected motion information to the imaging control section 31. With the angular velocity and the acceleration detected by the motion sensor 30, it is possible to detect the direction and the displacement of the camera 20.

For the communication between the image processing device 1 and an external device (e.g. between the camera 20 and the input section 10, or between the image processing section 15 and the display section 35, and the like), a variety of communication methods are applicable such as wired connection via a cable compatible with a predetermined communication standard, connection via an intermediate device known as a cradle, which also serves as a charger, a wireless connection using a near field communication technique, and the like.

[1-2. Processing]

When the user operates a button or the like provided in the camera 20 to capture the first image, the first photographed image is output from the camera 20 to the input section 10. The input section 10 outputs a photographing completion signal to the imaging control section 31 to indicate completion of the capture of the first image.

When the imaging control section 31 detects the completion of the capture of the first image based on the photographing completion signal, it outputs the current positional information of the camera to the guide display section 32. The current positional information is based on the location and direction of the camera at the time of capturing the first image as the origin. The guide display setting section 32 displays a marker (hereinafter referred to as a "current location marker") for indicating the current positional information of the camera in the imaging stand-by screen. In the embodiment, the current location marker is displayed after the first image is captured. However, it may also be displayed together with the photographing guide image before the first image is captured. In this case, the current location marker may be overlaid on the photographing guide image that shows the photographing position of the first image.

The current positional information of the camera 20 is constantly updated based on the motion information of the camera 20 that is output from the motion sensor 30 to the imaging control section 31. The user is notified of the updated motion information by the movement of the current location marker displayed in the imaging stand-by screen.

Then, the imaging control section 31 updates the current photographing guide image with the second photographing guide image by means of the guide display setting section 32. The second photographing guide image is designed to notify the user of a required direction and the degree to which the camera 20 is to be rotated by the user. For example, when the unit rotation angle is set to "30 degrees" as described above, the second photographing guide is an image that indicates a position of the camera that is rotated by 30 degrees in a predetermined direction from the position at the time of capturing the first image.

The user rotates the camera 20 so that the current location marker in the imaging stand-by screen overlaps the location indicated by the second photographing guide image. When the imaging control section 31 detects that the camera 20 has been rotated by a predetermined angle (e.g. 30 degrees) based on the motion information output from the motion sensor 30, it makes a notification that prompts the user to capture the second image by means of the guide display setting section 32. Based on the notification, the user operates a button or the like provided in the camera 20 to capture the second image. Thereafter, the user captures the third to fifth images in the same way.

In the above description, all images are captured according to a user operation. Instead, the imaging control section 31 may output a photographing command signal to the camera 20 to capture images automatically when it detects that the camera 20 has been rotated by the predetermined angle. In this case, in order to prevent the capture of an image while the user is rotating the camera 20, the user may be notified that automatic photographing is being performed, and then an image may be captured after the motion sensor 30 detects that the user stops rotating the camera 20 according to the notification.

In the above description, the motion information of the camera 20 is detected by means of the motion sensor 30. However, the detecting means is not limited thereto. For example, the motion information of the camera 20 may be detected based on the distance between characteristic points of images. Hereinafter, this technique will be described with reference to FIG. 1.

In the following description, the first photographed image (selfie) is referred to as a reference image Ir0, and the second and later photographed images are referred to as target images IcN (N=1, 2, ..., $N_{max}$).

The position of each of the second and later photographed images IcN is predetermined before photographing according to the setting of the rotation angle from the reference image Ir0 as described above.

The camera 20 converts a light signal that enters the camera 20 through a lens into an electric signal and outputs it to the input section 10 and the display section 35. This image information is displayed on the display section 35 as the imaging stand-by screen. The imaging stand-by screen is a real-time image (a motion picture that is updated constantly or at predetermined time intervals).

One of the images of the motion picture that is displayed on the imaging stand-by screen and updated constantly or at the predetermined time intervals is referred to as a current image IctM (M=N−1). The following description is based on a current image Ict0 (one of the images displayed in the imaging stand-by screen in real-time after capturing the reference image Ir0 and before capturing the second image (Ic1)).

The current image Ict0 is output from the camera 20 to the matching section 12 through the input section 10, and the matching section 12 retrieves information on a pair of the center coordinates of the reference image Ir0 and the current image Ict0. Then, the matching section 12 outputs the retrieved pair of center coordinates to the transformation matrix estimating section 13, and the transformation matrix estimating section 13 estimates a transformation matrix that correlates the coordinate system of the reference image Ir0 to the coordinate system of the current image Ict0.

Then, the transformation matrix estimating section 13 outputs the estimated transformation matrix to the imaging control section 31.

The imaging control section 31 performs alignment of the current image Ict0 with the reference image Ir0 based on the estimated transformation matrix. Then, a characteristic point (e.g. the center coordinate) of the reference image Ir0 is shifted by the predetermined angle (30 degrees in this case) and the coordinate of the shifted point is calculated. When the distance between the calculated coordinate and the coordinate of the corresponding characteristic point (e.g. the center coordinate) of the current image Ict0 is equal to or less than a predetermined value, it is determined that the camera has rotated by the predetermined angle. The alignment and the determination of camera rotation based on the transformation matrix may be performed by the alignment section 14, and the determination result may be output to the imaging control section 31.

Thereafter, a current image Ict1 (one of the real-time images displayed in the imaging stand-by screen between the capture of the second image and the capture of the third image), a current image Ict2 and so on are processed in the same way.

The above-described technique using the motion sensor and the technique using the coordinate of a characteristic point of each image may be used together to improve the accuracy of detecting the movement of the camera.

The panoramic imaging area, the number of shots and the unit rotation angle may be configured such that several preset combinations are stored in the image processing device 1 or a memory section of the camera 20 beforehand, and the user can select one of them according to the usage. Further, the image processing device may be configured such that the user can set desired values by inputting numbers. In this case, when the input value is beyond the settable range (e.g. when the input rotation angle is beyond the possible angle of view of the camera), an input error may be displayed so that the user is notified of the error.

[1-3. Variations]

The above-described image processing device 1 is merely an example of the image generating device according to the present disclosure, and the image generating device according to the present disclosure is not limited to the image generating device 1. The image generating device according to the embodiment can be changed or applied to other devices without departing from the features recited in the claims.

For example, while the camera 20 serially captures still images in the above-described embodiment, the camera 20 may capture a motion picture instead. In this case, the input section 10 may have a function of extracting serial images from the recorded motion picture. Alternatively, the input section 10 may input images that are transmitted from another device through a network.

While the images captured by the camera 20 have the same size in the above-described embodiment, the photographed images may vary in size in each photographing.

While the image processing device 1 includes the input section 10, the reference image selecting section 11, the matching section 12, the transformation matrix estimating section 13, the alignment section 14, the image compositing section 15, the imaging control section 31 and the guide display setting section 32 in the above-described embodiment, the configuration of the components may be suitably changed according to the required performance.

For example, a system may be configured such that the image processing device 1 includes the input section 10, the imaging control section 31 and the guide display setting section 32, while an information processing terminal such as an external server connected to the image processing device 1 has functions related to the image composition, i.e. the functions of the reference image selecting section 11, the matching section 12, the transformation matrix estimating section 13, the alignment section 14 and the image compositing section 15. In such cases, information on images captured by the camera 20 is output to the external server through the input section 10 of the image processing device 1 and a communication line, and the external server performs the image composition processing on the image information. A composite image generated by the external server may be output to the display section 35 through the communication line.

2. EXAMPLE

Next, a smartphone 2 will be described as an example of electronic devices that are equipped with the above-described image processing device 1. However, it should be understood well that the examples of the present disclosure are not limited to the following example.

[2-1. Functional Configuration]

Figure 2A:
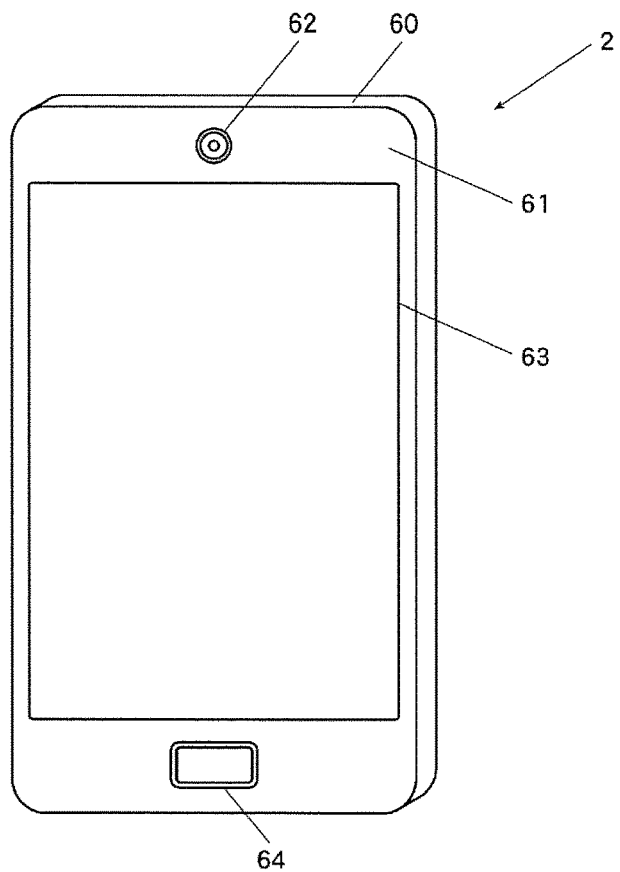
FIG. 2(a) and FIG. 2(b) are perspective views of a smartphone, illustrating an example of the configuration thereof.
Figure 2B:
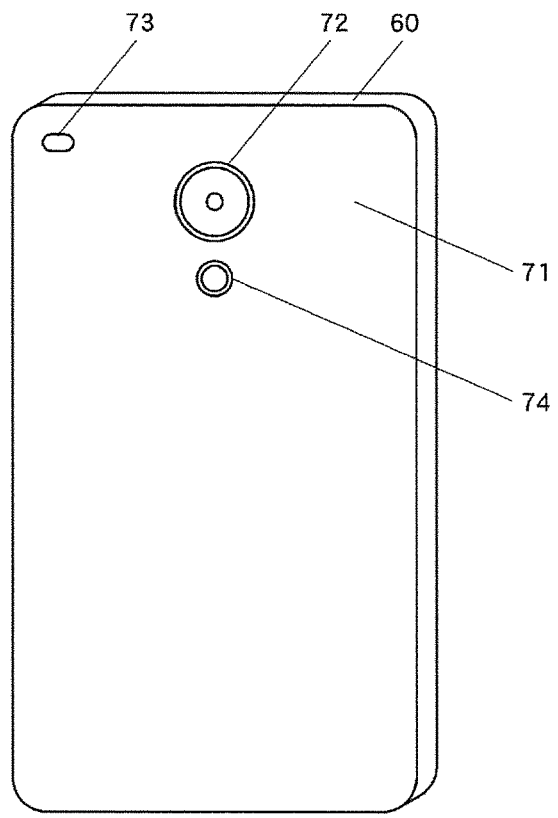

FIG. 2(a) and FIG. 2(b) are perspective views of a smartphone according to the present disclosure, illustrating an example of the configuration thereof FIG. 2(a) illustrates the front face 61 of a housing 60 of the smartphone 2, and FIG. 2(b) illustrates the back face 71 of the housing 60 of the smartphone 2.

The smartphone 2 is constituted by the housing 60, a front camera 62, a rear camera 72, a display (touch panel) 63, an operation button 64, a speaker 73 for sound output, a flash 74 and the like.

The front camera 62, the display (touch panel) 63 and the operation button 64 are disposed in the front face 61 of the housing 60, and the rear camera 72, the speaker 73 and the flash 74 are disposed in the back face of the housing 60.

For example, the display (touch panel) 63 is constituted by a display device including an LCD (liquid crystal display) screen and a touch sensor for detecting a touch gesture on the display.

The operation button 64 is a physical button disposed in the housing 50. In response to a user push operation on the operation button 64, a pre-assigned function is performed. Alternatively, the operation button 64 may be displayed on a touch panel as an icon image that is operable by a user touch gesture.

Figure 3:
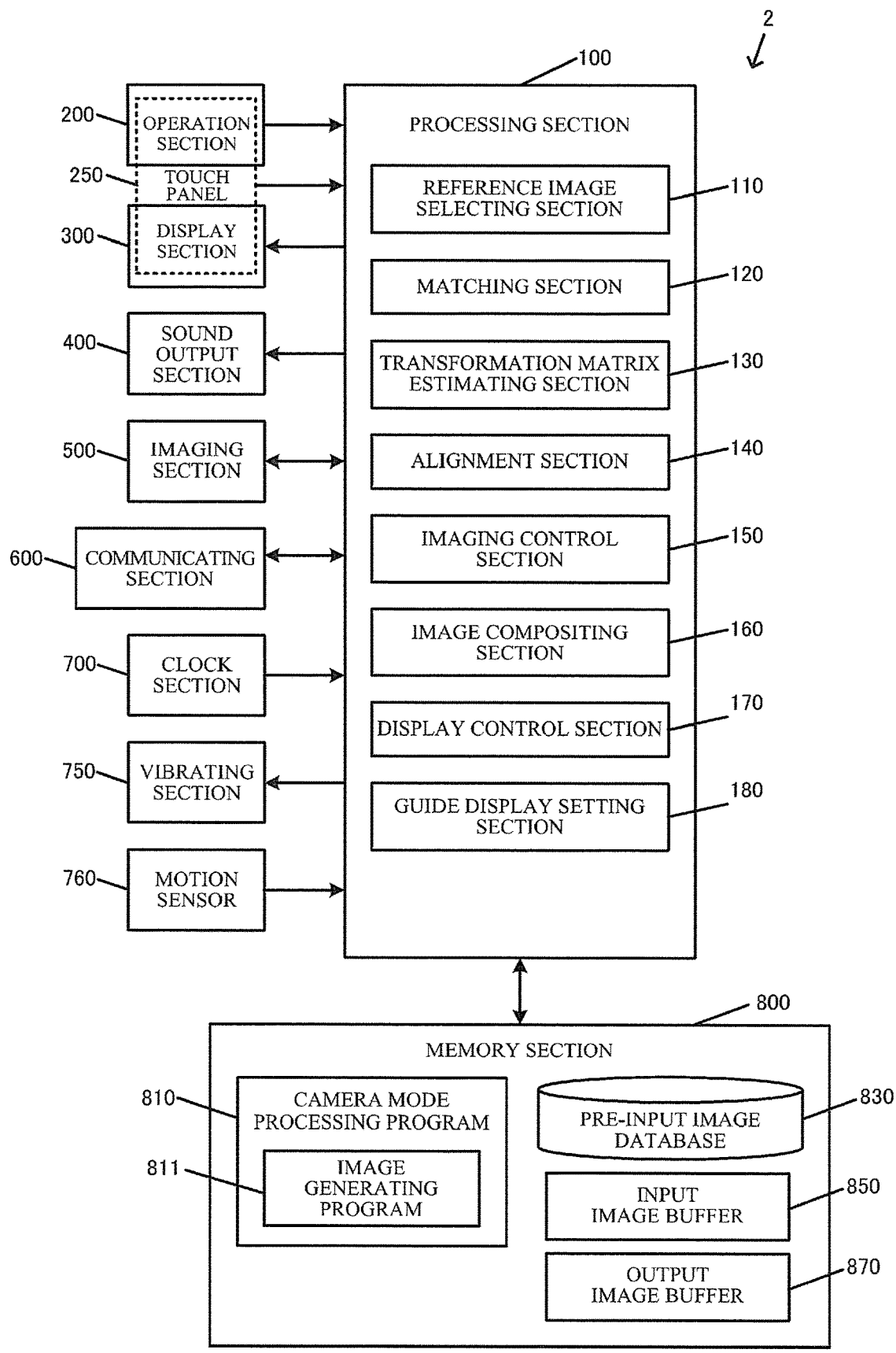
FIG. 3 is a block diagram of an example of the functional configuration of a smartphone.

FIG. 3 is a block diagram of an example of the functional configuration of the smartphone 2.

The smartphone 2 includes a processing section 100, an operation section 200, a display section 300, a sound output section 400, an imaging section 500, a communicating section 600, a clock section 700, a memory section 800, a vibrating section 750 and a motion sensor 760.

The processing section 100 integrally controls the components of the smartphone 2 according to a variety of programs stored in the memory section 800 such as a system program and performs a variety of processing related to image processing. The processing section 100 includes a processor such as a CPU and a DSP, and an integrated circuit such as an ASIC.

As main functional sections, the processing section 100 includes a reference image selecting section 110, a matching section 120, a transformation matrix estimating section 130, an alignment section 140, an image compositing section 160, a display control section 170, an imaging control section 150 and a guide display control section 180. These functional sections correspond respectively to the functional sections of the image processing device 1 of FIG. 1.

The operation section 200 includes an input device that is used for the user to input a variety of operations to the smartphone 2, such as an operation button, an operation switch and a mouse. The operation section 200 includes a touch panel 250 that is integrally formed with the display section 300. The touch panel 250 serves as an input interface between the user and the smartphone 2. The operation section 200 outputs an operation signal according to a user operation to the processing section 100.

The display section 300 is a display device that includes an LCD (liquid crystal display) and the like. The display section 300 displays a variety of information based on the display signal output from the processing section 100. The display section 300 is integrally formed with the touch panel 250 to constitute a touch screen. The display section 300 displays a variety of images such as photographed images and corrected images.

The sound output section 400, which is a sound output device with a speaker or the like, outputs a variety of sounds based on a sound output signal output from the processing section 100.

The imaging section 500, which is an imaging device capable of capturing an image of an arbitrary scene, includes an imaging element such as a CCD (charge coupled device) imaging sensor or a CMOS (complementary MOS) imaging sensor. The imaging section 500 converts a light signal to an electric signal to output a digitized photographed image data to the processing section 100.

As imaging devices, the imaging section 500 includes the front camera 62 disposed on the side with the display section 300 of the smartphone 2 and the rear camera 72 disposed on the opposite side.

The front camera 62 and the rear camera 72 are configured to be interchangeable according to a user input or the like. The front camera 62 is mainly used for capturing selfies, which are self-portraits of the user who holds the smartphone 2, or group photos. The rear camera 72 is used for capturing photographs of people other than the user, landscapes and the like.

The communicating section 600 is a communicating device for transmitting and receiving information to be used in the device to and from an external information processing device. The communicating section 600 may be based on any of a variety of communication methods including wired connection via a cable compatible with a predetermined communication standard, connection via an intermediate device known as a cradle, which also serves as a charger, a wireless connection using a near field communication technique, and the like. In the following examples, the images displayed on the display section 300 of the smartphone 2 may be displayed on an external display terminal device that is connected to the smartphone 2 by wired or wireless communication through the communicating section 600.

The clock section 700, which is an internal clock of the smartphone 2, includes, for example, a quartz oscillator composed of a quartz resonator and an oscillating circuit. The time acquired by the clock section 700 is constantly output to the processing section 100.

The memory section 800 is a storage device that includes a volatile or non-volatile memory such as a ROM an EEPROM, a flash memory and a RAM, and/or a hard disk drive, and the like. The memory section 800 stores a system program for the processing section 100 to control the smartphone 2, as well as programs and data for a variety of image processing.

In the example, the memory section 800 stores a camera mode processing program 810 that is read out and executed as a camera mode processing by the processing section 100. The camera mode processing program 810 includes an image generating program 811 as a sub-routine, which is executed as the image generation processing.

The memory section 800 further includes a pre-input image database 830 that stores image information of a photographed image input from the imaging section 500 to the processing section 100 as a pre-input image, an input image buffer 850 that temporarily stores sequentially input photographed images, and an output image buffer 870 that stores a generated final composite image.

The vibrating section 750, which is a vibration generator composed of a motor and the like, generates a variety of vibrations based on a vibration generating signal output from the processing section 100. The vibration generator is used for vibrating the smartphone 2, which is an example of a means of notifying the user.

The motion sensor 760 is capable of detecting motion information of the smartphone 2. The motion sensor 760 converts the motion information of the smartphone 2 to an electric signal to output it to the processing section 100.

The imaging control section 150 is a functional section that controls the processing of the guided selfie photographing mode and the like of the smartphone 2 (described below). The imaging control section 150 processes data output from the operation section 200, the imaging section 500, the matching section 120, the transformation matrix estimating section 130 and the motion sensor 760 and the like and outputs them to the guide display setting section 180, the display section 300, the sound output section 400, the imaging section 500 and the vibrating section 750.

The guide display setting section 180 generates a guide image and the like based on the data output from the imaging control section 150 and outputs them to the display section 300.

[2-2. Processing]

Figure 4:
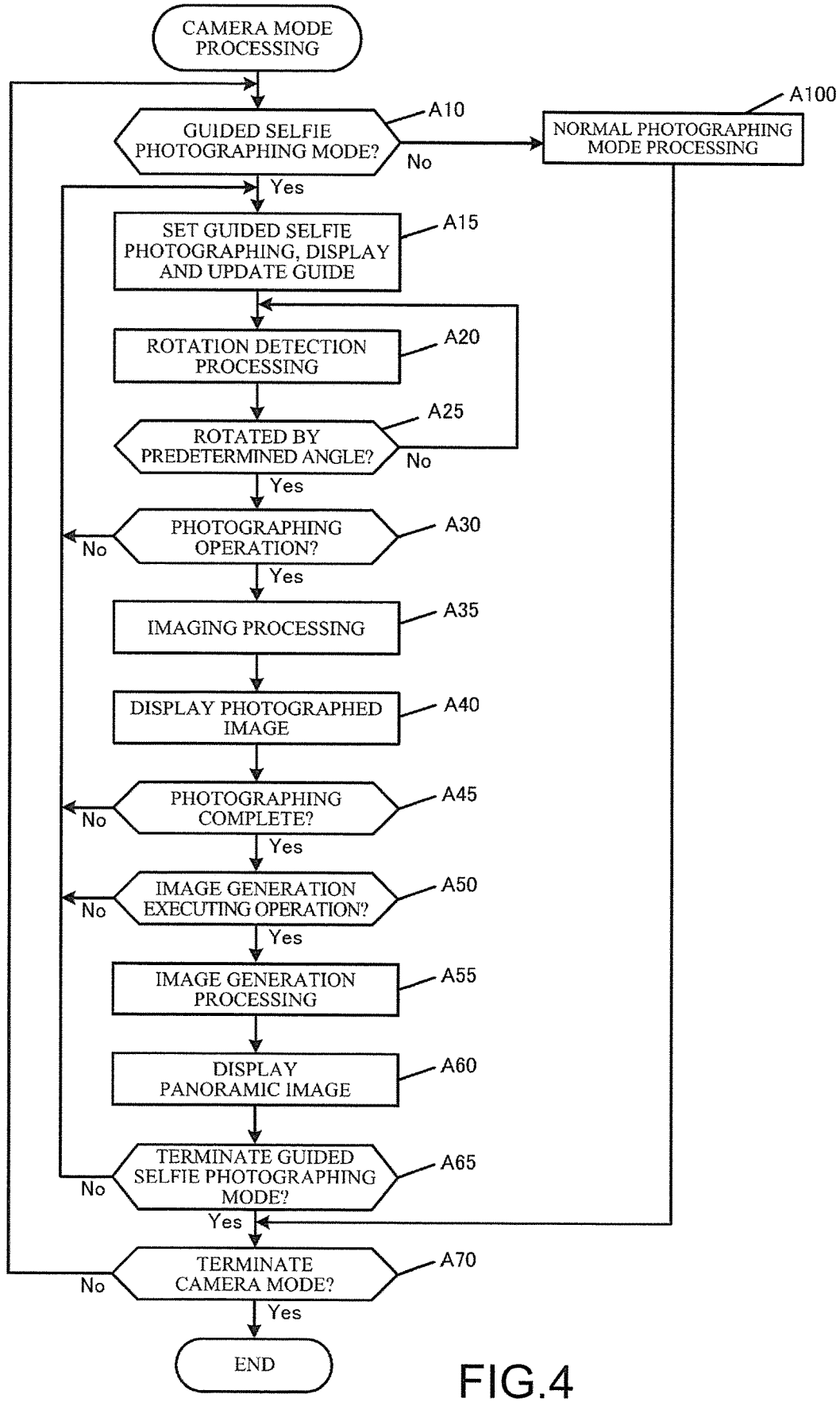
FIG. 4 is a flowchart of guided selfie photographing mode processing, illustrating an example of the flow thereof.

FIG. 4 is a flowchart illustrating an example of the flow of the camera mode processing, which is executed by the processing section 100 of the smartphone 2 according to a camera mode processing program 810 stored in the memory section 800. The camera mode processing is performed when the user activates a camera application.

First, the processing section 100 makes a determination as to whether the mode selected by the user through the operation section 200 is a guided selfie photographing mode (A10). If the guided selfie photographing mode is selected (A10, Yes), the imaging control section 150 sets the panoramic imaging area, the number of shots and the unit rotation angle and outputs the respective setting values to the guide display setting section 180. The guide display setting section 180 generates the photographing guide image and the current location marker image (described below) based on the setting values and displays them in the imaging stand-by screen on the display section 300 (A15).

When face area detection is performed, a step of performing face area detection may be added between the step of selecting the guided selfie photographing mode (A10) and the step of setting the guided selfie photographing (A15).

The imaging stand-by screen in the guided selfie photographing mode is composed of a current image, the photographing guide image and the current location marker image. The current image is a so-called real-time image that is updated at the predetermined time intervals. A light signal that enters an imaging sensor through a lens of the imaging section 500 (the front camera 62 in the guided selfie photographing mode) is converted to an electric signal by means of the imaging element and output to the processing section 100. The display control section 190 displays the image of the electric signal on the display section 300. The current image is constantly updated until the number of images captured reaches the number of shots set in A15 (e.g. five images).

The photographing guide image is provided to prompt the user to rotate the smartphone 2 by a predetermined angle and to notify the user of the number and the sequence of photographing and the like. The current location marker is provided to notify the user of the current positional information of the smartphone 2.

The user stretches his/her arm forward to move the smartphone 2 while visually checking the imaging stand-by screen, and aims the imaging section 500 of the smartphone 2 at the user himself/herself. Then, the user operates a button or the like provided in the operation section 200 to capture the first image (A35). In the processing for the first image, the step of detecting the rotation (A20) and the step of making the notification that prompts the user to capture an image (A30) are omitted since the first image is a normal selfie of the user. In this case, the display of the current location marker is omissible.

After the imaging section 500 completes the photographing, the display control section 190 displays the photographed image on the display section 300 (A40).

In this step, the processing may be configured such that when the user wants to recapture the image after checking the photographed image, he/she can operate a button or the like provided in the operation section 200 so that the processing returns to A35 where the imaging section 500 performs imaging processing to capture an image again.

Then, when the number of images captured is less than the number of shots set in A15 (S45, No), the process returns to A15. The imaging control section 150 updates the current photographing guide image with the second photographing guide image so as to make a notification that prompts the user to rotate the smartphone 2 to the direction in which the second image is captured (hereinafter referred to as an imaging direction) (A15).

The user rotates the smartphone 2 according to the notification so that the current location marker in the imaging stand-by screen is brought to the location indicated by the second photographing guide image. The imaging control section 150 detects the rotation of the smartphone 2 based on the motion information output from the motion sensor 760 (A20). If the imaging control section 150 detects that the smartphone has been rotated by the predetermined angle (e.g. 30 degrees) set in A15 (A25, Yes), it makes a notification that prompts the user to capture the second image by means of the guide display setting section 180 (A30).

Subsequently, the user operates the button or the like provided in the operation section 200 to capture the second image (A35). Thereafter, the third and later images are captured in the same way. If the number of images captured reaches the number of shots set in A15 (five images) (A45, Yes), the processing section 100 makes a determination as to whether the user performs an execution operation of generating a panoramic image on the operation section 200 (A50). If it is determined that the operation is not performed (A50, No), the process returns to A15 where the guided selfie photographing settings are configured again.

If it is determined that the user performs the execution operation of generating a panoramic image (A50, Yes), the processing section 100 performs image generation processing according to an image generating program 811 stored in the memory section 800 (A55).

Then, the display control section 190 displays a panoramic composite image generated by the image generation processing on the display section 300 (A60). Thereafter, a determination is made as to whether the user performs an operation of terminating the guided selfie photographing mode (A65). If it is determined that the operation is not performed (A65, No), the process returns to A15.

In A10, if it is determined that the guided selfie photographing mode is not selected (A10, No), the processing section 100 performs normal photographing mode processing (A100). In the normal photographing mode processing, the processing section 100 controls the imaging section 500 to capture a single image in response to a user photographing operation on the operation section 200, stores the photographed image in the memory section 800 and displays it on the display section 300.

If it is determined in A65 that the operation of terminating the guided selfie photographing mode is performed (A65, Yes), or after the normal photographing mode processing in A100, the processing section 100 makes a determination as to whether the user performs an operation of terminating the camera mode (A70). If it is determined that the operation is not performed (A70, No), the process returns to A10. If it is determined that the operation is performed (A70, Yes), the camera mode processing ends.

In the above description, all images are captured according to a user button operation or the like. Instead, the imaging control section 150 may automatically capture an image by outputting a photographing command signal to the imaging section 500 when it detects that the direction of the smartphone 2 coincides with the imaging direction indicated in the photographing guide (when the smartphone 2 has been rotated by the predetermined angle), which is detected on the basis of the rotation angle detected by the motion sensor 760. In this case, in order to prevent the capture of an image while the user is rotating the smartphone 2, the smartphone 2 may be preferably configured such that the image is automatically captured after the motion sensor 760 detects that the smartphone 2 remains still for a predetermined time (e.g. 1 sec).

Alternatively, the smartphone 2 may be configured such that the imaging control section 150 makes a notification that guides the user to stop the rotation when it detects that the smartphone 2 has been rotated by the predetermined angle (e.g. 30 degrees) by means of the motion sensor 760. Then, after the motion sensor 760 detects that the smartphone 2 remains still for a predetermined time (e.g. 1 sec), the imaging control section 150 may output a photographing command signal to the imaging section 500 to capture an image automatically. The notification that guides the user to stop the rotation may be made not only when the smartphone 2 has been rotated by the predetermined angle (e.g. 30 degrees) but also when the smartphone 2 has been rotated so that the rotation angle reaches a predetermined range of the predetermined rotation angle (e.g. 25 degrees of 30 degrees). Further, different notifications may be made when the smartphone 2 has been rotated by the predetermined angle and when the smartphone 2 has been rotated so that the rotation angle reaches the predetermined range. When the photographing is performed automatically as described above, the notification that prompts the user to perform a photographing operation (A30) is omitted.

In the above description, the motion of the smartphone 2 is detected by means of the motion sensor 760 (A20). However, the detecting means is not limited thereto. For example, the movement of the smartphone 2 may be detected on the basis of the distance between characteristic points of images as described in section 1-2, "Processing". Further, it is possible to use both the detection by means of the motion sensor 760 and the detection based on the distance between characteristic points.

(Utilization of External Server)

In the above-described examples, the processing section 100 of the smartphone 2 includes the reference image selecting section 110, the matching section 120, the transformation matrix estimating section 130, the alignment section 140, the image compositing section 160, the display control section 170, the imaging control section 150 and the guide display control section 180. However, the components may be suitably changed.

For example, a system may be configured such that the processing section 100 of the smartphone 2 includes the imaging control section 150, the display control section 170 and the guide display control section 180 while an external information terminal, such as a server that is provided externally to the smartphone 2, has functions related to image composition, i.e. the functions of the reference image selecting section 110, the matching section 120, the transformation matrix estimating section 130, the alignment section 140 and the image compositing section 160. The information on images captured by the imaging section 500 is output to an external server through the communicating section 600 and a communication line, and the external server performs the image composition processing on the image information. The composite image generated by the external server is output to the display section 300 of the smartphone 2 through the communicating section 600 and the communication line.

The output of the image information from the smartphone 2 to the external server may be performed according to an output command of the imaging control section 150 with respect to each image, a predetermined number of images, a predetermined period of time or every time the smartphone 2 becomes connectable to the external server, or the like. For example, it is suitable that the image information is output when a predetermined number of images have been captured according to the photographing guide image. The image composition processing by the external server may be automatically performed when the predetermined number of images are input. Alternatively, the imaging control section 150 may send an image composition processing command to the external server when the predetermined number of images have been captured according to the photographing guide image. The output of the composite image from the external server and the display thereof may be automatically performed when the composite image has been generated. For example, they may be performed according to a user operation on the operation section 200 of the smartphone 2.

In this way, the image composition processing, in which the amount of data to be processed increases according to the number of photographed images and the number of pixels of each photographed image, is performed by the external server. This can reduce the amount of data to be processed by the smartphone 2. Further, since the alignment processing of the image composition processing requires a large load of data processing, a portable terminal such as the smartphone 2 can sometimes generate only a roughly aligned composite image due to the data processing power of a processing section (processor such as CPU or DSP and integral circuit such as ASIC) installed therein when it is required to perform the composition processing at high speed. However, when a server that has much higher data processing power than portable terminals performs the image composition processing, it is possible to obtain an accurately aligned composite image at high speed.

In the above-described examples, the memory section 800 of the smartphone 2 includes the pre-input image database 830 that stores image information of a photographed image input from the imaging section 500 to the processing section 100 as a pre-input image, the input image buffer 850 that temporarily stores sequentially input photographed images, and the output image buffer 870 that stores a generated final composite image. However, the composite image may be stored in a memory section of an external server connected to the smartphone 2. This can reduce the amount of data stored in the memory section 800 of the smartphone 2.

Further, the composite image may also be displayed on an external display terminal device that is connected to an external server by wired or wireless communication as well as the display section 300 of the smartphone 2. The external display terminal device may display the composite image according to a user operation on the operation section 200 of the smartphone 2. Alternatively, the external display terminal device may read out and display the composite image stored in the memory section of the external server without going through an operation or processing by the smartphone 2. This enables viewing the composite image on the external display terminal even while the smartphone 2 is being used for another task. Further, the user can view the composite image in a screen of the external display terminal that is larger than the display section 300 of the smartphone 2. Further, for example, since the composite image is viewable on the external display terminal device without going through an operation or processing by the smartphone 2, the user can view a composite image that is generated from previously photographed images and set the photographing guide image and perform a photographing operation for the next photographing.

[2-3. Display Screen]

FIG. 5(*a*) and FIG. 5(*b*) illustrate an example of the imaging stand-by screen that is displayed on the display section 300 in the guided selfie photographing mode.

FIG. 5(*a*) illustrates a state in which the guided selfie photographing mode in FIG. 4 is started in the camera mode processing, and the current image, the photographing guide image and the current location marker image are displayed in the imaging stand-by screen (A15).

In the imaging stand-by screen of FIG. 5(*a*), the user 40 who is holding the smartphone 2 in his/her hand and the background are displayed as the current image.

Further, as the photographing guide image, two different guides are displayed which are a rotation guide 41 in the shape of an elliptic annular sector (an ellipse arc with a certain width) and a center guide 43 in the shape of a round spot. As the current location marker, two different markers are displayed, which are a rotation marker 42 corresponding to the rotation guide 41 and a center marker 44 corresponding to the center guide 43. The rotation guide 41 and the center guide 43 are arranged such that the centers thereof are aligned along the vertical center line (center axis) of the display section 300.

The elliptic annular sector shape of the rotation guide 41 as illustrated in FIG. 5(*a*) is suitable for guiding the user to capture a plurality of images while rotating the smartphone 2 to the left and right about the vertical center line of the display section 300 as the rotation axis. The rotational axis does not necessarily need to be displayed as long as the user can understand the position thereof. In the example of FIG. 5(*a*), the rotational axis is not displayed since the shape of the rotation guide 41 can make the user aware that the rotational axis is located on the vertical center axis of the display section 300.

The angle (inner angle) of the elliptic annular sector of the rotation guide 41 corresponds to the angle of view (panoramic imaging area) of a panoramic image to be generated. In FIG. 5(*a*), the angle is 150 degrees, which is an example of a settable angle. When the panoramic imaging area is set to an angle less than 150 degrees, e.g. 90 degrees, the angle of the rotation guide 41 is reduced accordingly.

Figure 5A:
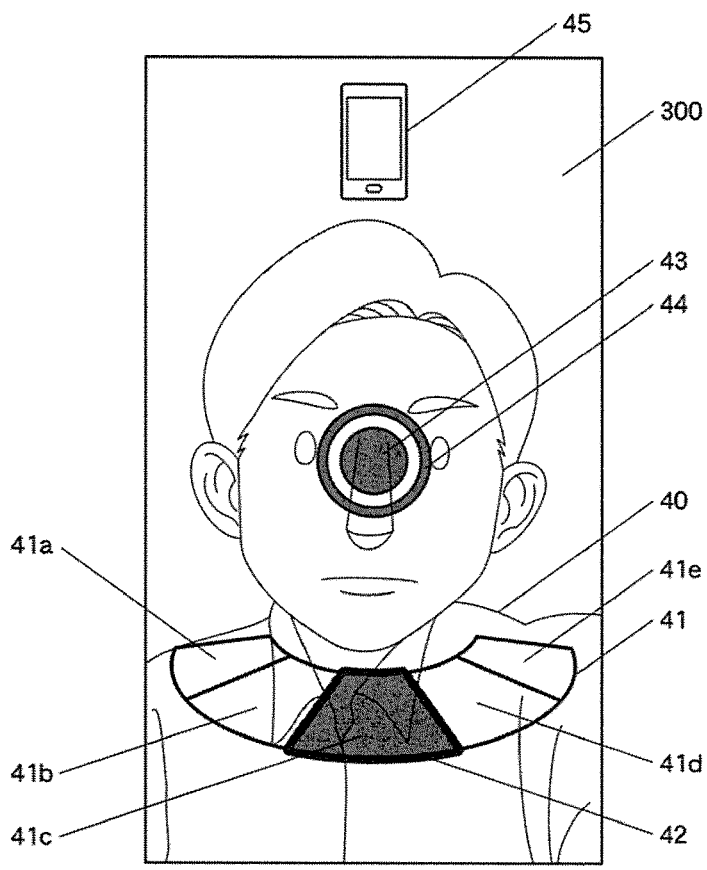
FIG. 5(a) and FIG. 5(b) illustrate an example of a photographing guide image displayed on a display section of the smartphone.
Figure 5B:
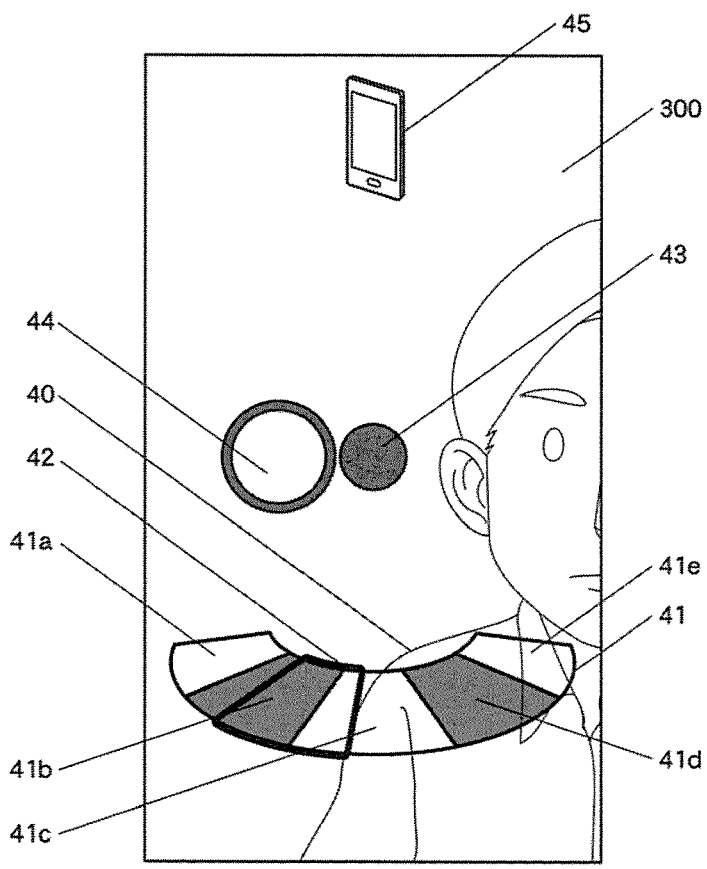

The rotation guide 41 is sectioned into five areas based on the set unit rotation angle (e.g. 30 degrees), which are referred to as rotation guide units 41a to 41e. The number of divided areas of the rotation guide 41, i.e. the number of rotation guide units, indicates the number of shots in the photographing, which is five in the example of FIG. 5(a). Further, as illustrated in FIG. 5(a) and FIG. 5(b), the rotation guide units that correspond to the next imaging directions are highlighted by hatching so that the user is made aware of them. In FIG. 5(a), which illustrates the imaging stand-by screen for the capture of the first image (front face selfie of the user), only the rotation guide unit 41c is highlighted by hatching so as to be distinguishable from the other rotation guide units.

Therefore, just by glancing at the rotation guide 41, the user is reminded to capture a plurality of images while rotating the smartphone 2. Furthermore, the user can also understand the panoramic imaging area, the unit rotation angle, the number of shots and the next imaging directions.

As described below, the shape of the rotation guide 41 is not limited to the shape as illustrated in FIG. 5(a). For example, rotation guide units in the shape of rectangular cards may be arranged along the circumference of an eclipse or a circle. In addition, the arrangement may give depth to the card guide units.

The rotation guide units are distinguished from each other by solid lines in FIG. 5(a). However, the display manner is not limited thereto, and they may be displayed in any manner that can visualize the border between adjacent rotation guide units.

In FIG. 5(a), rotation guide units corresponding to the next imaging directions are highlighted by hatching. Instead of hatching, a predetermined color (e.g. blue) with a predetermined opacity (e.g. 50%) may be applied. This enables the user to immediately visually check the rotation guide units corresponding to the next imaging directions while he/she can also view the current image. The display manner is not limited thereto, and they may be highlighted in any manner that can distinguish the rotation guide units corresponding to the next imaging directions from the other rotation guide units. For example, the rotation guide units corresponding to the next imaging directions may be highlighted by displaying the outer frames thereof in a different color, causing them to blink or the like.

Figure 6A:
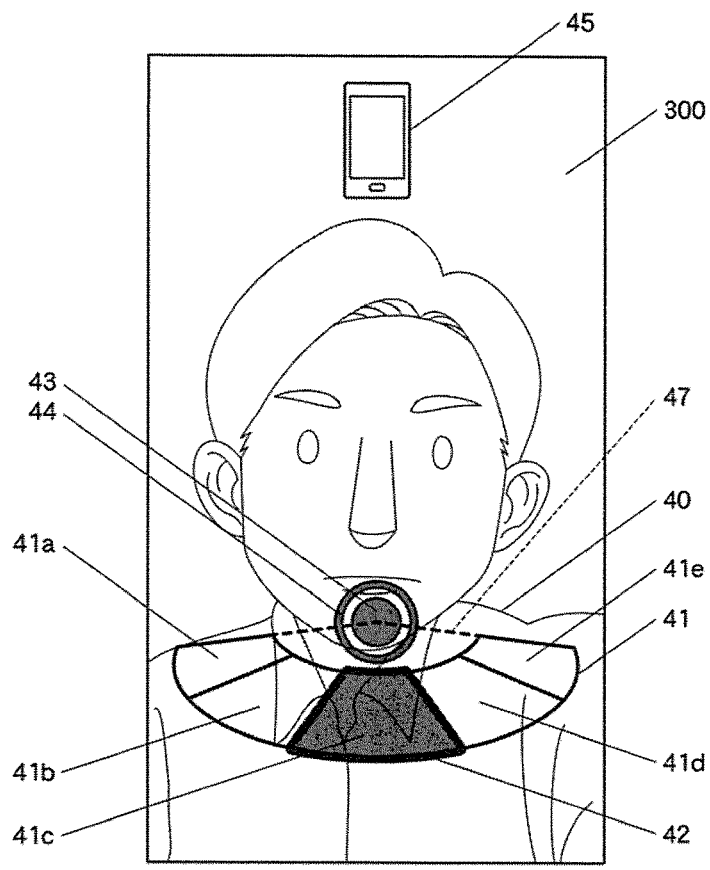
FIG. 6(a) and FIG. 6(b) illustrate an example of a photographing guide image displayed on the display section of the smartphone.
Figure 6B:
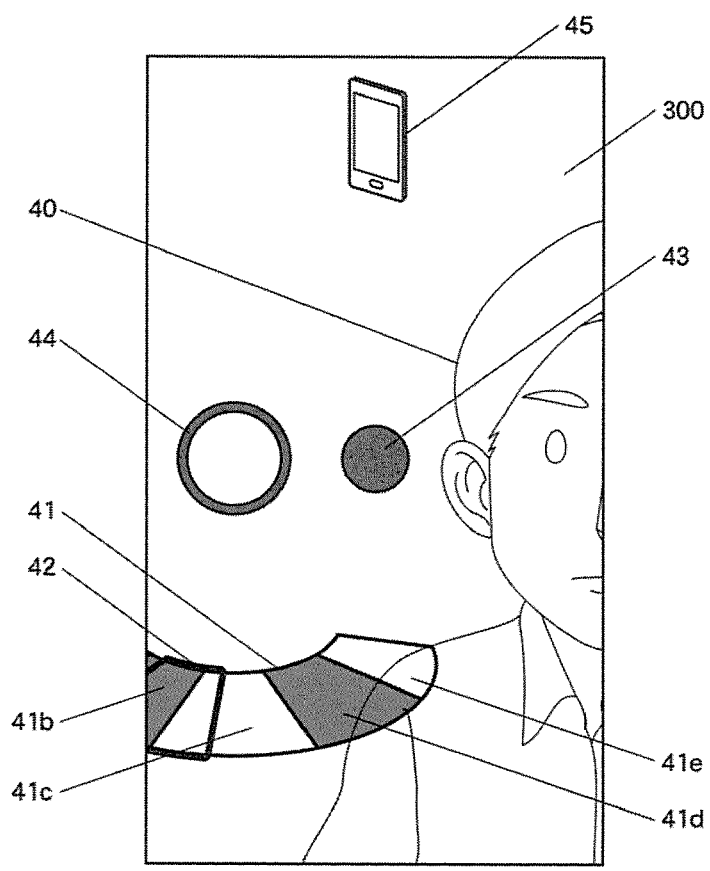

The rotation marker 42 is displayed over the rotation guide units 41c in FIG. 5(a). Hereinafter, such a condition is referred to as a guide-marker coincided condition. The rotation marker 42 and the rotation guide units 41a to 41e will be described later using FIG. 5(b), FIG. 6(a) and FIG. 6(b).

An appearance rotation guide 45, which is a schematic outer appearance of the smartphone 2, is displayed as rotating according to the rotational movement of the smartphone 2. With the appearance rotation guide 45, the user can immediately and intuitively understand in which rotational direction the smartphone 2 is to be rotated.

In FIG. 5(a) and FIG. 5(b), the rotation marker 42 is drawn by a bolder solid line than the rotation guide 41. However, the display manner is not limited thereto. For example, in order to improve the visibility of the rotation marker 42, it may be displayed in a different color from the rotation guide 41. The color of the rotation marker 42 may be changed according to whether the rotation marker 42 is apart from or coincided with the rotation guide 41. When the guide coincides with the marker, a notification may be made by means of a light (e.g. causing the rotation marker 42 to blink), the vibration of the smartphone 2 or a voice.

The rotation guide 41 may be displayed as a line (e.g. solid line, dashed line or the like) along an arc of a circle or an eclipse, and the rotation marker 42 may be displayed as a figure, a character, a symbol or the like. In such cases, a mark such as a figure, a character or a symbol may be displayed in the middle of the arc of each rotation guide unit, and an image is captured when the smartphone 2 is rotated so that the rotation marker 42 coincides with any one of the marks.

Next, the center guide 43 and the center marker 44 in FIG. 5(a) will be described.

When the user rotates the smartphone 2 in order to capture the second and later images, he/she may erroneously shift the smartphone in the vertical or horizontal direction. For example, when the user finishes capturing images on his/her left side and then rotates the smartphone 2 back to his/her front face in order to capture images on his/her right side, the smartphone 2 may be erroneously deviated in the vertical or horizontal direction from the location at the time of capturing the first image due to fatigue in the arm holding the smartphone 2 or the like. When the user rotates the smartphone 2 at the deviated location and captures an image on his/her right side, the resultant image may be largely misaligned with the first photographed image, which may eventually impair the quality of the generated panoramic image. The center guide 43 and the center marker 44 are provided to notify the user of such deviation in the vertical or horizontal direction so as to prompt the user to correct the location of the smartphone 2.

The center guide 43 is displayed as a round spot centered on the center of the imaging stand-by screen. For example, when the user captures a selfie as the first image, he/she can bring the center of his/her face to the center of the screen as illustrated in FIG. 5(a) by moving the smartphone 2 to bring the center of his/her face to the center guide 43. That is, the center of the imaging stand-by screen serves as an aiming point that indicates the area to be photographed.

The center marker 44, which is displayed as a ring larger than the center guide 43, is displayed in the imaging stand-by screen corresponding to the movement of the smartphone 2 in the vertical or horizontal direction. In FIG. 5(a), which illustrates the imaging stand-by screen when capturing the first image, the center marker 44 and the center guide 43 are displayed respectively as a round spot and a ring centered on the center of the imaging stand-by screen. This arrangement indicates that there is no deviation.

In order to notify the user of the occurrence of deviation in the vertical or horizontal direction, for example, the center of the imaging stand-by screen at the time of capturing the first image is continuously displayed as the center guide 43 in the imaging stand-by screen. When the user erroneously shifts the smartphone 2 while rotating it, the center marker 44 is displayed at a location deviated from the center guide 43 in the shifted direction.

In FIG. 5(a) and FIG. 5(b), the center guide 43 is displayed in the shape of a round spot, and the center marker 44 is displayed in the shape of a ring. Further, the center guide 43 and the center marker 44 are displayed at a predetermined opacity (e.g. 50%). However, the display manner is not limited thereto. For example, the center guide 43 and the center marker 44 may be displayed as rectangles, rhombuses or any figure other than a circle, or characters, symbols or the like. In order to improve the visibility of the center marker 44, for example, it may be displayed in a different color from the center guide 43. The color of the center marker 44 may be changed according to whether the center marker 44 is apart from or coincided with the center guide 43. When the center guide 43 coincides with the center marker 44, a notification may be made such as a notification by light (e.g. blinking the center marker 44), a notification by vibration of the smartphone 2 or a notification by voice.

After the first image is captured (A35), since the number of images captured is still less than the set number of shots (A45, No), the imaging control section 150 updates the current photographing guide image with the second photographing guide image (A15).

FIG. 5(*b*) illustrates the state in which the user is rotating the smartphone 2 according to the second photographing guide image.

In the second photographing guide image, the rotation guide units 41*b* and 41*d* of the rotation guide 41 corresponding to the next imaging directions are highlighted by hatching, and the user chooses either left or right as the direction to rotate the smartphone 2. In FIG. 5(*b*), the user is rotating the smartphone 2 in the direction to the rotation guide unit 41*b* (to the left), and the rotation marker 42 is moving according to the rotation angle.

In FIG. 5(*b*), the center marker 44 is displayed at a location deviated to the left from the center guide 43. This means that the user erroneously shifted the smartphone 2 to the left when rotating the smartphone 2. The user can correct the deviation in the horizontal direction by shifting the smartphone 2 to the right until the center of the center marker 44 overlaps the center of the center guide 43, i.e. the positional relationship between the center guide 43 and the center marker 44 becomes the same as the relationship as illustrated in FIG. 5(*a*). FIG. 5(*b*) illustrates a deviation to the left as an example, and a deviation in the vertical direction can be corrected similarly.

In the upper part of the imaging stand-by screen as illustrated in FIG. 5(*a*) and FIG. 5(*b*), the appearance rotation guide 45, which is a schematic illustration of the outer appearance of the smartphone 2, is displayed along with the vertical solid line representing the rotation axis 48 and the arrowed solid line indicating the rotational movement. As with the rotation marker 42, an appearance rotation guide 45 is configured to rotate in the direction and angle according to the rotation of the smartphone 2. The user can visually check the actual rotational direction of the smartphone 2 and the rotational direction of the appearance rotation guide 45 at the same time and can therefore readily rotate the smartphone 2 to the next imaging direction.

Hereinafter, variations of the photographing guide image and the current location marker image in FIG. 5(*a*) will be described with reference to FIG. 6(*a*) to FIG. 8(*b*). However, the examples of the present disclosure are not limited to those variations, and the shape, the display location and the combination of the photographing guide image and the current location marker image of the examples can be changed without departing from the features recited in the claims.

(Disposal of Center Guide 43 at Center of Rotation Guide 41)

FIG. 6(*a*) illustrates an example in which the center guide 43 is displayed at the center of the eclipse arc which constitutes the rotation guide 41. Specifically, the center guide 43 is disposed such that the center thereof is coincided with the center of the arcs of eclipses that constitute the outline of the rotation guide 41. In the example of FIG. 6(*a*), the dashed lines 47 that connect the ends of the rotation guide 41 with the center of the eclipses are further displayed. A figure or a symbol may be further displayed at the center. As with the example of FIG. 5(*a*), the rotation guide 41 and the center guide 43 are disposed such that the centers thereof are on the vertical center axis of the display section 300. The rotation marker 42 and the center marker 44 have the same function as those of the example of FIG. 5(*a*) and FIG. 5(*b*).

With the rotation guide 41 and the center guide 43 displayed as illustrated in FIG. 6(*a*), the user can visually check both of the rotation guide 41 and the center guide 43 without moving his/her eye. Therefore, the user can readily rotate the smartphone 2 and correct the location thereof in the vertical or horizontal direction.

(Combined Movement of Center Marker 44 and Rotation Guide 41)

FIG. 6(*b*) illustrates an example in which the display location of the rotation guide 41 is changed in conjunction with the positional shift of the center marker 44.

When the smartphone 2 is erroneously shifted to the left as illustrated in FIG. 5(*b*), the center marker 44 is deviated from the center guide 43 displayed at the center of the display section 300 corresponding to the positional shift. In the example of FIG. 5(*b*), the rotation marker 42 is configured not to move. In contrast, in the example of FIG. 6(*b*), the rotation guide 41 moves to the left in conjunction with the positional shift of the center marker 44.

With this configuration, the user can understand it more readily that the current location of the smartphone 2 is deviated from the center location.

(Notification of Moving Operation Error: Deformation of Rotation Marker 42)

Figure 7A:
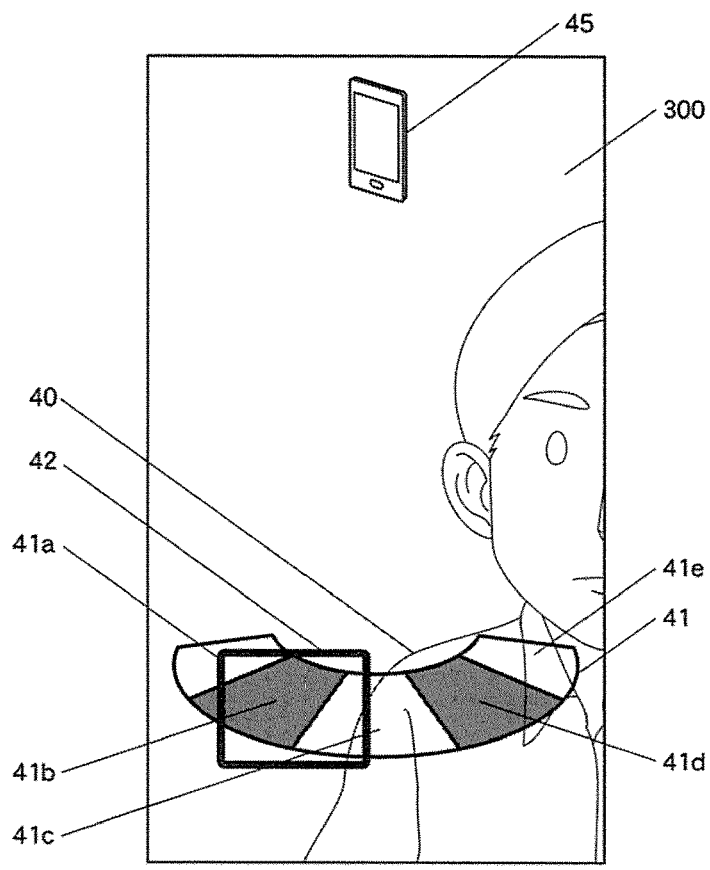
FIG. 7(a) and FIG. 7(b) illustrate an example of a photographing guide image displayed on the display section of the smartphone.
Figure 7B:
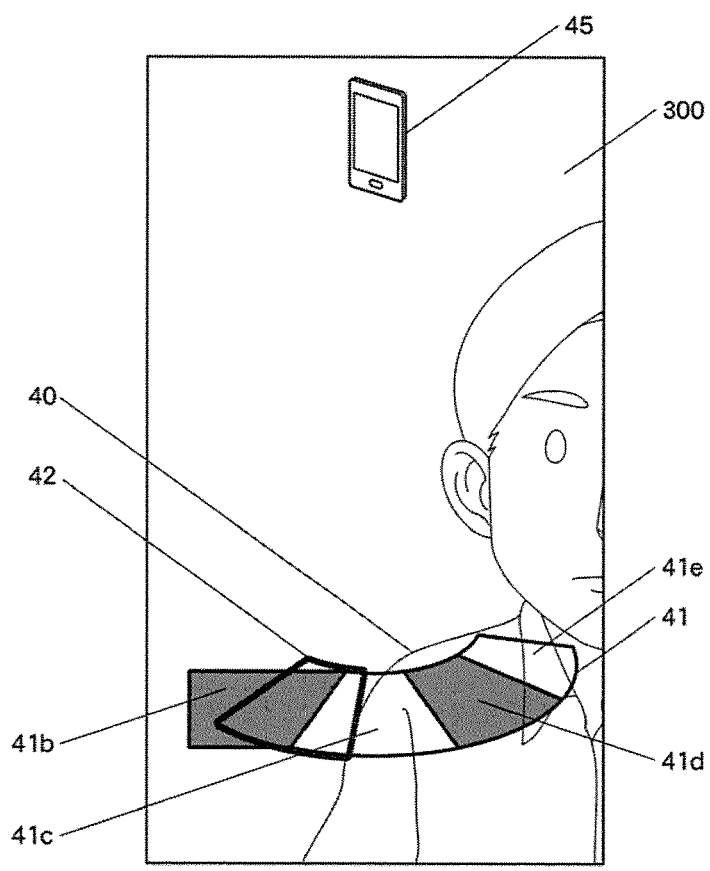

FIG. 7(*a*) illustrates an example in which the user is notified of a moving operation error by deformation of the rotation marker 42 when the smartphone 2 is moved in a manner other than rotation.

The smartphone 2 is configured such that when it is shifted to the left, the rotation marker 42 deforms corresponding to the positional shift. For example, as illustrated in FIG. 7(*a*), the rotation marker 42, which is normally in the shape that corresponds to the rotation guide unit 41*b*, may be displayed in a rectangular shape. Further, the rotation marker 42 may be changed in color or caused to blink.

This enables the user to be notified of a moving operation error of the smartphone 2 by the display of the rotation guide 41 and the rotation marker 42 only.

(Notification of Moving Operation Error: Deformation of Rotation Guide 41)

FIG. 7(*b*) illustrates an example in which the user is notified of an operation error by deformation of the rotation guide 41 or the rotation guide unit 41*b* when the smartphone 2 is moved in a manner other than rotation.

When a part of the rotation marker 42 or the rotation guide 41 (rotation guide unit 41*b*) is deformed into a rectangular shape as illustrated in FIG. 7(*a*) or FIG. 7(*b*), the user can immediately understand that it is impossible to bring the rotation marker 42 to the rotation guide unit 41*b* as illustrated in FIG. 9(*c*) (and it is therefore impossible to capture an image) only by rotating the smartphone 2 at the current location.

(Notification of Moving Operation Error: Movement of Rotation Marker 42)

FIG. 8(*a*) illustrates an example in which, when the smartphone 2 is moved in a manner other than rotation, the user is notified of a moving operation error by the rotation marker 42 displayed at a location deviated from the rotation guide 41, which normally moves inside or along the shape of the rotation guide 41.

For example, as illustrated in FIG. 8(*a*), the smartphone 2 is configured such that, when it is erroneously shifted upward, the rotation marker 42 moves upward to be deviated from the rotation guide 41 according to the positional shift.

Similarly, when the smartphone 2 is shifted to the left, the rotation marker 42 may move to the left to be deviated from the rotation guide 41.

Figure 9A:
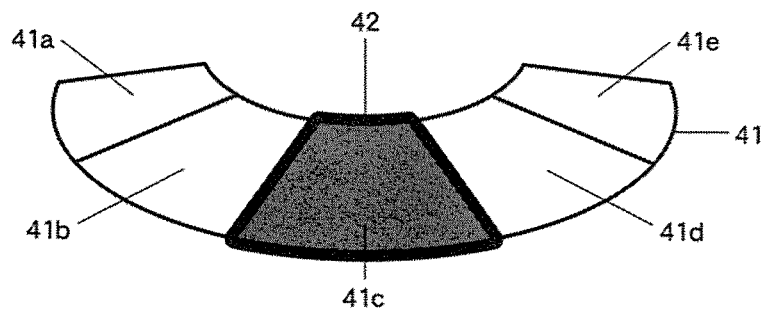
FIG. 9(a) to FIG. 9(e) illustrate an example of a rotation guide image displayed on the display section of the smartphone.
Figure 9B:
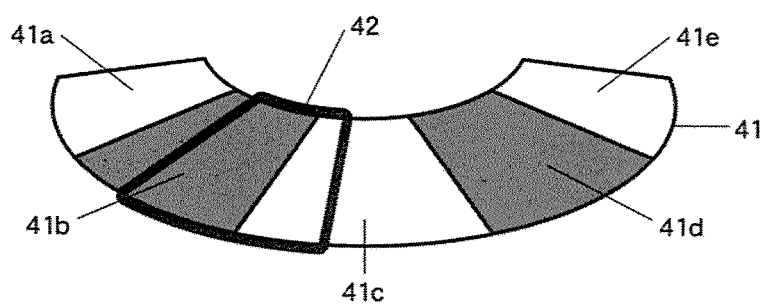
Figure 9C:
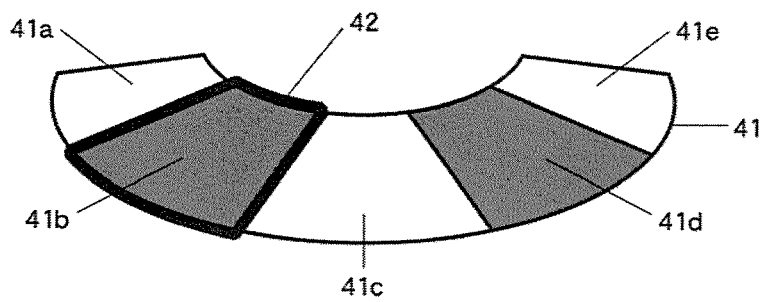

When the rotation marker 42 is deviated from the rotation guide 41, the user can immediately understand that it is impossible to bring the rotation marker 42 to the rotation guide unit 41b as illustrated in FIG. 9(c) (i.e. to capture an image) only by rotating the smartphone 2 at the current location.

(Line Connecting Center of Center Guide 43 with Center of Center Marker 44)

As illustrated in FIG. 8(b), the smartphone 2 may be configured to display a straight line 46 that connects the center of the center guide 43 with the center of the center marker 44. This enables the user to clearly understand that it is necessary to bring the center of the center guide 43 to the center of the center marker 44. Further, to make the notification move effective, an arrowhead that indicates the direction to the center of the center guide 43, i.e. the direction in which the user corrects the location of the smartphone 2, may be added to an end of the straight line 46.

Further, the width and the color of the straight line 46 may be changed according to the length (distance between the center of the center guide 43 and the center of the center marker 44) of the straight line 46. In this case, for example, the width of the straight line 46 may be increased as the length thereof is decreased, or the color of the straight line 46 may be changed from blue to red when the length thereof is increased.

When the user corrects the location of the smartphone 2 so that the center of the center guide 43 coincides with the center of the center marker 44 or so that a rotation guide unit coincides with the rotation marker, the guide or the marker may be partly or fully changed in color or caused to blink so that the user is notified.

In the above-described examples, a notification to the user is made by the movement or color change of a figure, a symbol, a character or the like that represents the guide or the marker. Instead, a notification to the user may be made by displaying numerical information on the display section 300 in order to guide the user to perform a movement required to obtain suitable images.

For example, when the smartphone 2 is shifted to the left as illustrated in FIG. 5(b), the distance required to correct the location of the smartphone 2, e.g. the distance to the point 10 cm right from the current location, is displayed as numerical information on the display section 300 in real time. The user can correct the positional shift of the smartphone 2 by shifting the smartphone 2 to the right while checking the numerical information so that the distance becomes 0 cm.

Similarly, when the smartphone 2 is rotated, the direction and the unit rotation angle (e.g. 30 degrees to the left) are displayed on the display section 300 as numerical information, and the remaining angle from the current rotation angle to 30 degrees is also displayed as numerical information in real time. The user rotates the smartphone 2 while checking the numerical information so that the angle becomes 30 degrees. In this way, it is possible for the user to rotate the smartphone 2 to the direction suitable for capturing an image.

In the above-described examples, it is assumed that the user corrects the location of the smartphone 2 according to a notification and continues to capture images. However, when the deviation is large, it is sometimes more efficient not to correct the location but to cancel the photographing process. To achieve this, a step of cancelling the process of the photographing mode may be added between A25 and A30, in which, if the imaging control section 150 detects that the deviation is greater than a predetermined value by means of the motion sensor 760, the process returns to A15 of setting the photographing guide for the first or current image. Further, a text message may be displayed on the display section 300 so that the user is notified of the cancellation.

FIG. 9(a) to FIG. 9(e) illustrate an example of the change of the rotation guide 41 and the rotation marker 42 displayed in the imaging stand-by screen on the display section 300 while the first to fourth images are captured.

The rotation guide 41 and the rotation marker 42 in FIG. 9(a) and FIG. 9(b) are the same as those in FIG. 5(a) and FIG. 5(b), and the description thereof is omitted.

FIG. 9(c) illustrates a state in which the rotation marker 42 is coincided with the rotation guide unit 41b like the state of FIG. 9(a). This means that the smartphone has been rotated to the second photographing position by the user. In this state, a notification that prompts the user to capture the second image is made (A30).

Figure 9D:
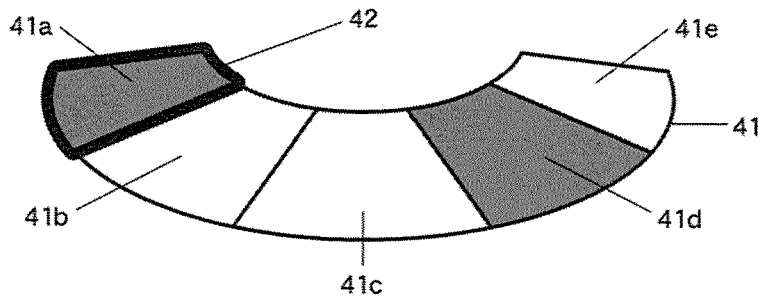

After the second image is captured, the current photographing guide image is updated with the third photographing guide image as in the step after the first image is captured. That is, the hatching of the rotation guide unit 41b is erased, and the rotation guide unit 41a is highlighted by hatching instead. FIG. 9(d) illustrates a state in which the user has changed the direction of the smartphone 2 according to the third photographing guide image so that the rotation marker 42 is coincided with the rotation guide unit 41a. In this state, the third image is captured.

Figure 9E:
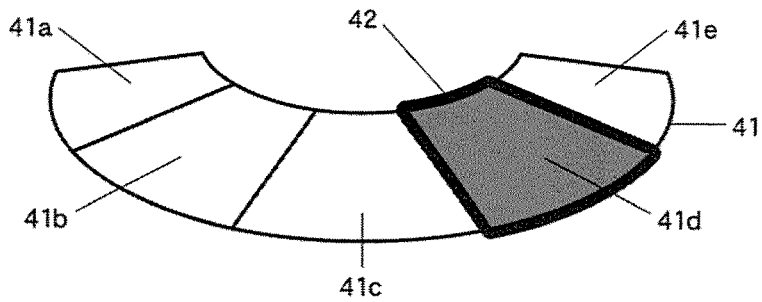

FIG. 9(e) illustrates a state in which the user has similarly changed the direction of the smartphone 2 according to the fourth photographing guide image so that the rotation marker 42 is coincided with the rotation guide unit 41d. In this state, the fourth image is captured.

In the subsequent fifth photographing guide image (not shown), only the remaining rotation guide unit 41e is highlighted by hatching. The user changes the direction of the smartphone 2 according to the fifth photographing guide image until the rotation marker 42 coincides with the rotation guide unit 41e. Then, the user captures the fifth image.

Figure 10A:
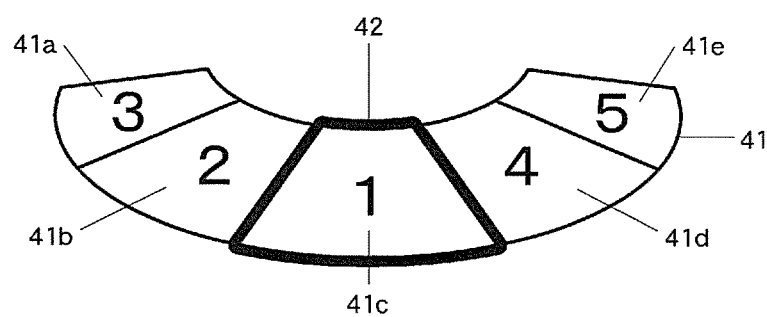
FIG. 10(a) and FIG. 10(b) illustrate an example of the rotation guide image displayed on the display section of the smartphone.
Figure 10B:
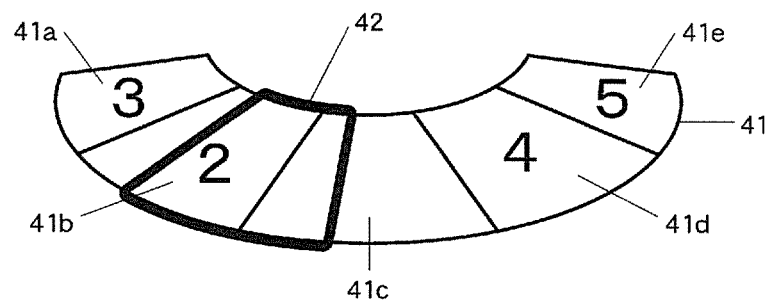

FIG. 10(a) and FIG. 10(b) illustrate another example of the display manner of the rotation guide.

In the example of FIG. 5(a) to FIG. 9(e), the rotation guide unit corresponding to the next photographing direction is highlighted by hatching in order to indicate the photographing order. In the example of FIG. 10(a) and FIG. 10(b), the photographing order is indicated by numbers. First, the user captures the first image at the position of the rotation guide unit 41c that is labeled as "1" as illustrated in FIG. 10(a). Subsequently, the user captures images at the positions corresponding to the rotation guide units 41b, 41a, 41d and 41e in the order of the labeled numbers. As illustrated in FIG. 10(b), the number on each rotation guide unit may be hidden when the corresponding image is captured. Further, the numbers indicating the photographing order may be combined with the hatching.

(Guided Vertical Photographing Mode)

In the above-described examples, a plurality of images is captured while the smartphone 2 is rotated about the vertical center axis of the display section 300 as the rotation axis so that a horizontally wide-angle panoramic composite image is obtained. However, the guide function of the disclosure is also useful for capturing a plurality of images while rotating the smartphone 2 about the horizontal center line of the display section 300 so as to obtain a vertically wide-angle panoramic composite image.

To achieve this, a step of selecting a guided vertical photographing mode may be added after starting the camera mode processing. When the guided vertical photographing mode is selected, a step of setting guided vertical photographing and displaying and updating the guide may be performed instead of the step of setting guided selfie photographing and displaying and updating the guide (A15).

As the guide for the user, the rotation axis line, a vertically long rectangular rotation guide, rotation guide units that are sections (e.g. three sections) of the rotation guide divided according to the unit rotation angle, and a rotation marker having the shape corresponding to the rotation guide units are displayed. The vertically long rotation guide is disposed such that the center thereof is on the rotation axis. That is, the horizontal center line that serves as the rotation axis passes through the center of the vertically long rotation guide. The rotation guide may be in the shape of a trapezoid having a shorter upper base or a triangle, which is divided into sections according to the unit rotation angle that may serve as the rotation guide units. Along with them, the center guide and the center marker may also be displayed.

(Circular Rotation Guide)

Figure 11A:
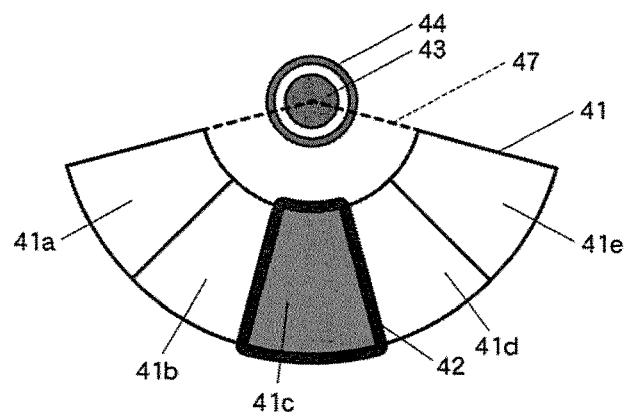
FIG. 11(a) to FIG. 11(d) illustrate an example of the rotation guide image displayed on the display section of the smartphone.

In the above-described examples, the rotation guide 41 is in the shape of an elliptic annular sector. However, the shape of the rotation guide 41 is not limited thereto. For example, it may be in the shape of a circular annular sector (circular arc with a certain width) as illustrated in FIG. 11(a). FIG. 11(a) illustrates an example in which the center guide 43 and the center marker 44 are displayed in the same location as the example of FIG. 6(a) as well as the rotation guide 41.

(Elliptic or Circular Sector Rotation Guide)

In the above-described examples, the rotation guide 41 is in the shape of an elliptic or circular annular sector as illustrated in FIG. 5(a) to FIG. 10(b) and FIG. 11(a). Instead, the rotation guide 41 may be in the shape of an elliptic or circular sector (portion of a circular or elliptic disk divided in radial directions). In this case, the rotation guide is in the shape of a circular or elliptic sector having a predetermined inner angle (e.g. 150 degrees), and each of the rotation guide units is in the shape of an elliptic or circular sector having an inner angle of the unit rotation angle (e.g. 30 degrees).

Instead of a circular or elliptic arc, the outline of the rotation guide units may be constituted by a straight line. In this case, when the part around the center point of the rotation guide is not removed, each rotation guide unit is in the shape of a triangle having an inner angle of the unit rotation angle (e.g. 30 degrees).

(Combination of Guides: Appearance Rotation Guide Disposed at Center of Rotation Guide)

Figure 11B:
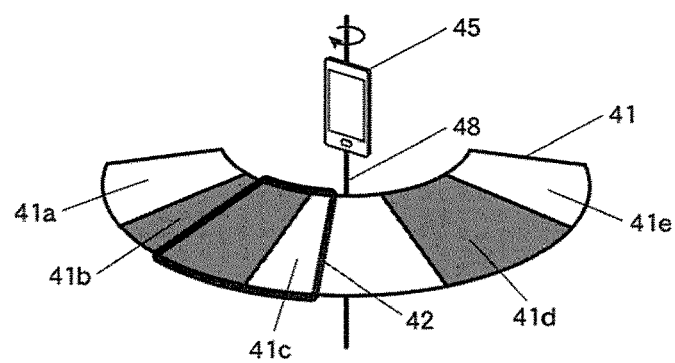

The combination of different guides is not limited to the combination of the rotation guide 41 and the center guide 43. For example, the rotation guide 41 may be combined with the appearance rotation guide 45 as illustrated in FIG. 11(b). In the example of FIG. 11(b), the rotation axis 48 and the appearance rotation guide 45 are disposed at the center of the arcs of the elliptic annular sector of the rotation guide 41.

With the arrangement as illustrated in FIG. 11(b), the user can visually check both the rotation guide 41 and the appearance rotation guide 45 without moving his/her eyes. Further, displaying the rotation axis 48 can make the user clearly aware that the rotation axis is on the smartphone 2.

(Screen Rotation Guide)

Figure 11C:
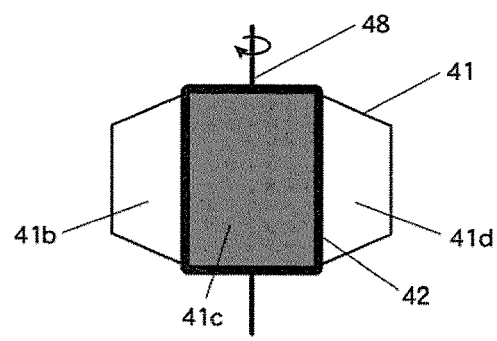

As illustrated in FIG. 11(c), the rotation guide 41 may be in a shape composed of a horizontally aligned plurality of quadrangular rotation guide units in which the rotation guide units (rotation guide units 41b, 41d in the figure) adjacent to the center rotation unit 41c have an inclined shape. Further, the rotation axis 48 may also be displayed on the vertical center line of the rotation guide unit 41c. Such an arrangement of a plurality of rotation guide units in the shape of a rectangle (screen) can express the direction and degree of the inclination of each rotation guide as those of the corresponding plane. This is advantageous in that they are readily comparable with the actual direction and degree of the inclination of the smartphone 2.

(Circular or Polygonal Cylindrical Rotation Guide)

Figure 11D:
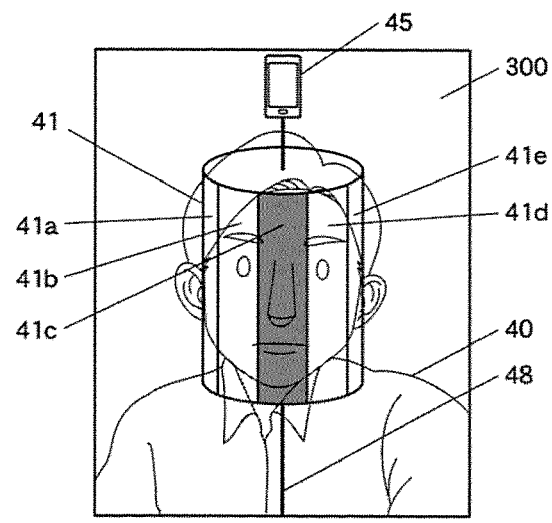

As illustrated in FIG. 11(d), the rotation guide 41 may be in the shape of a cylinder. In this case, the rotation guide units 41a to 41e are portions of the side wall of the cylinder divided in the vertical direction based on the unit rotation angle (e.g. 30 degrees). Further, as illustrated in FIG. 11(d), a straight line connecting the centers of the upper and bottom faces of the cylinder may be displayed as the rotation axis 48, and the appearance rotation guide 45 may be further displayed on the rotation axis 48. The cylinder may be a polygonal cylinder. In this case, each of the rotation guide units 41a to 41e corresponds to one of the side wall rectangles of the polygonal cylinder.

(Display Location of Guides)

Regarding the display location in the display section 300, the photographing guide may be configured as follows. For ease of description, the following configuration examples are described based on the rotation guide 41 and the rotation marker 42. However, it should be understood well that the present disclosure is not limited thereto.

(Display at Screen Center or Center of Face Area)

Figure 12A:
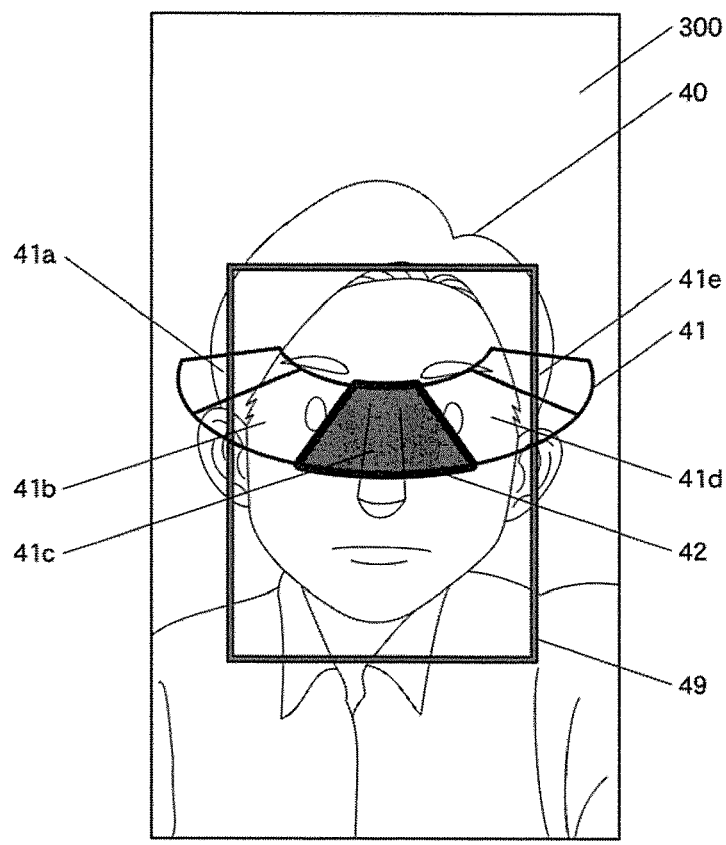
FIG. 12(a) and FIG. 12(b) illustrate an example of the rotation guide image displayed on the display section of the smartphone.

FIG. 12(a) illustrates an example in which the rotation guide 41 is displayed at the center of the display section 300. In FIG. 12(a), the rotation guide 41 is displayed such that the center of the rotation guide unit 41c in the middle of the rotation guide 41 is coincided with the center of the display section 300. However, it may also be displayed such that the center of the elliptic arcs of the outline of the rotation guide 41 is coincided with the center of the display section 300.

Further, the smartphone 2 may be configured to perform face area detection and to display the rotation guide 41 such that the center of the rotation guide unit 41c or the center of the elliptic arcs of the outline of the rotation guide 41 is coincided with the center of a rectangular face area 49 that is displayed as a result of the face area detection.

As used herein, face area detection is a type of object detection processing for detecting a human face, which is performed based on a method known in the art such as the Viola-Jones method or a face area detection technique using Haar-like features. To perform the face area detection, a step of face area detection processing may be added between the step of determining the guided selfie photographing mode (A10, Yes) and the step of setting the guided selfie photographing (A15). For ease of description, the detected face area is described as a rectangle. However, it should be understood well that the face area is not limited to a rectangular shape but may be a square, circular or elliptic shape or the like.

With this configuration, the user, who is operating the camera, can visually check both the rotation guide 41 and a photographing subject (face of the user 40 in this case) without moving his/her eyes.

(Display of Guide and Marker Outside the Face Area)

Figure 12B:
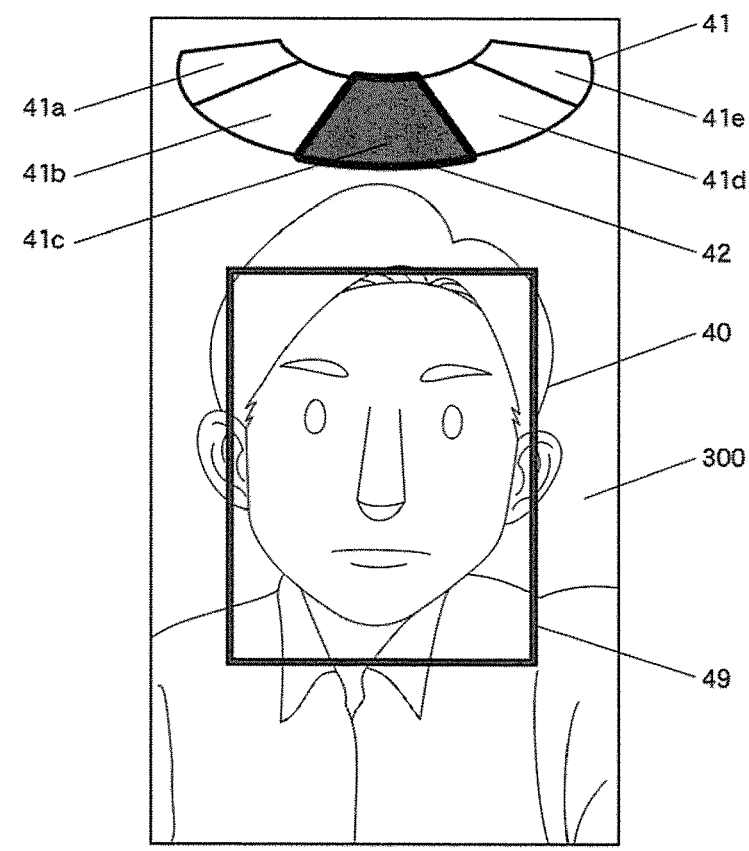

As illustrated in FIG. 12(b), the rotation guide 41 and the rotation marker 42 may be displayed outside the face area 49. In the example of FIG. 12(b), the rotation guide 41 and the rotation marker 42 are displayed in the upper part of the display section 300 outside the face area 49. However, they may also be displayed in the lower part of the display section 300 outside the face area 49. This configuration is advantageous in that the user can visually check the condition of the subject (expression on his/her face or the like in this case) more readily since the rotation guide 41 and the rotation marker 42 are separate from the face area 49 and do not overlap.

Further, the rotation guide 41 and the rotation marker 42 may be displayed as close as possible to the face area 49 provided that it does not overlap the face area 49. That is, the rotation guide 41 in FIG. 12(b) may be displayed closer to the rectangular area of the face area 49. With this configuration, the user can visually check both the condition of the subject and the rotation guide 41 without moving his/her eyes.

(Display of Guide and Marker Near Front Camera)

Figure 13A:
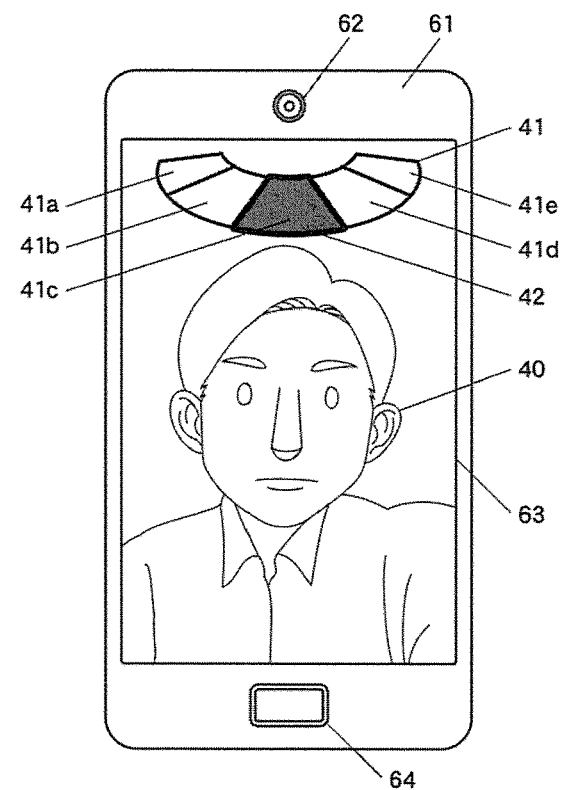
FIG. 13(a) and FIG. 13(b) illustrate an example of the rotation guide image displayed on the display section of the smartphone.

As illustrated in FIG. 13(a), the rotation guide 41 and the rotation marker 42 may be displayed near the front camera 62 of the smartphone 2. When the rotation guide 41 and the rotation marker 42 are apart from the front camera 62, the user's gaze is likely not to be directed toward the front camera 62 but toward the rotation guide 41 and the rotation marker 42 at the time of capturing an image. As a result, the user's gaze is deviated downward from the front camera 62 in the resultant image. To avoid this, the rotation guide 41 and the rotation marker 42 may be displayed near the front camera 62 as illustrated in FIG. 13(a). This configuration enables the user's gaze to be directed toward the vicinity of the front camera 62 at the time of capturing an image. Further, the user can keep his/her gaze toward the vicinity of the front camera 62 when he/she rotates the smartphone 2 and captures images while visually checking the rotation guide 41 and the rotation marker 42. This can improve the operability.

(Multiple Face Area Detection: Display of Guide and Marker on Selected Face Area or Outside Detected Face Areas, and Setting of Panoramic Imaging Area)

When creating a group photo, for example, a plurality of human faces may sometimes be displayed on the display section 300 in addition to the face of the user who is operating the camera. In such cases, the rotation guide 41 is configured to be displayed such that the center of the rotation guide unit 41c or the center of the arcs of the outline of the rotation guide 41 is coincided with the center of a face area that is selected from among the plurality of face areas. The selection of a face area is made according to a user operation such as a tap, a double tap or a long tap. Alternatively, a face area may be automatically selected according to a predetermined condition. For example, to select the face area of the user who is operating the camera from among a plurality of face areas, the largest face area or the face area closest to the center of the display section 300 may be automatically selected as a possible face area of the user.

Figure 13B:
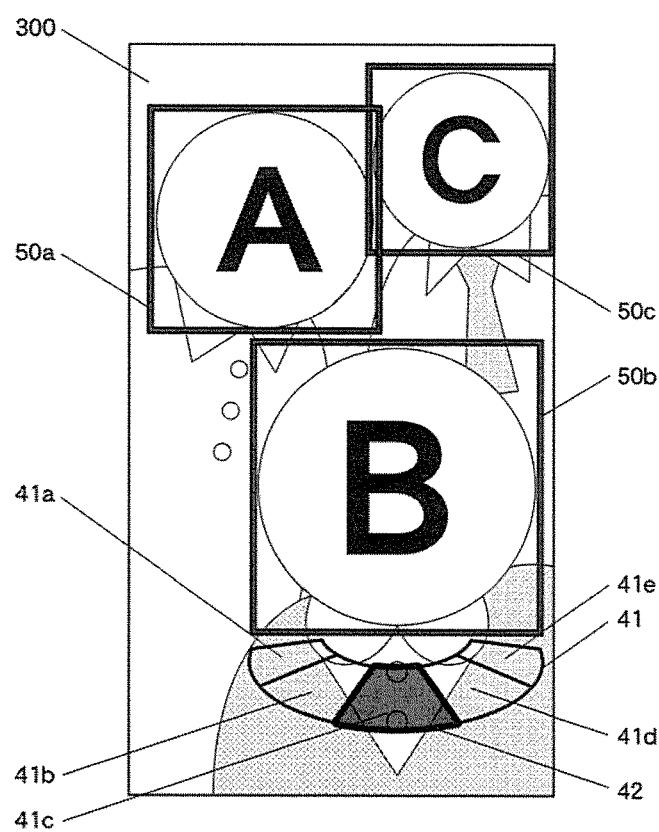

Alternatively, the rotation guide 41 may be displayed in areas other than a detected plurality of face areas as illustrated in FIG. 13(b). In the example of FIG. 13(b), the rotation guide 41 is displayed near a face area 50b outside the detected plurality of face areas 50a, 50b and 50c.

In the description of the example of FIG. 5(a), the rotation guide 41 is disposed such that the center thereof is on the vertical center axis of the display section 300, and the panoramic imaging area (e.g. 150 degrees) is set with reference to the center axis. However, the smartphone 2 may be configured as follows for the case in which a plurality of face areas is shown as described above.

That is, after one face area is selected from among the plurality of face areas as described above, the panoramic imaging area (e.g. 150 degrees) may be set with reference to the vertical center axis of the selected face area. In this case, it is preferred that a notification of the change of the center of the panoramic imaging area is made by means of a letter or a symbol such as an arrow. Further, in order to distinguish the selected face area from the other face areas, it is effective to change the color of the frame of the selected face area or to cause the frame to blink.

In this way, this configuration enables a panoramic imaging area that is centered on a selected face area to be set when a plurality of human faces is shown on the display section 300. The smartphone 2 may be configured such that the user can select whether only the display location of the guide is to be set either in a selected face area or outside the selected face area, or whether the center of the panoramic imaging area is also to be changed, for example, through a menu displayed on the display section 300.

(Change of Guide Display Location According to User Operation)

The smartphone 2 may be configured such that the user can select the displayed rotation guide 41 by an operation such as a tap, a double tap, a long tap or the like and move the rotation guide 41 to a desired location in the display section 300 by a drag operation. Further, the smartphone 2 may be configured such that the user can select the displayed rotation guide 41 by an operation such as a tap, a double tap, a long tap or the like and change the size of the rotation guide 41 by a pinch operation.

Further, the size of the rotation guide 41 may be changed according to the display location of the rotation guide 41 in the display section 300 and the size of the displayable area. For example, when the photographing guide is displayed in an area outside the face areas as illustrated in FIG. 13(b), the said other area may sometimes be small (i.e. the displayable area for the photographing guide in the display section 300 is small). In such cases, the photographing guide may be reduced in size according to the size of displayable area.

(Preferential Display of Guide)

The smartphone 2 may be configured such that the display of the guide is preferred over a subject when the smartphone 2 is not in a photographing position. For example, until the smartphone 2 is rotated to the next photographing position (e.g. by a unit rotation angle of 30 degrees), the guide is displayed with a different brightness to the scene that includes the subject captured by the front camera 62. For example, the guide is displayed with greater brightness than the scene captured by the front camera 62, or the scene captured by the front camera 62 is displayed with a lesser brightness than the guide. The preferential display of the guide may be terminated when the smartphone 2 is rotated to the photographing position or when it is within a predetermined range of the photographing position. Alternatively, the difference in brightness may be gradually reduced as the smartphone 2 is rotated toward the photographing position until the difference is eliminated, i.e. the preferential display is terminated when the smartphone 2 reaches the photographing position. The preferential display is not limited to a difference in brightness and may be achieved in any manner that causes a difference in visibility for the user who views the display screen, such as a difference in lightness or a combined difference of brightness and lightness.

(Rectangular Rotation Guide and Center Axis)

Figure 14A:
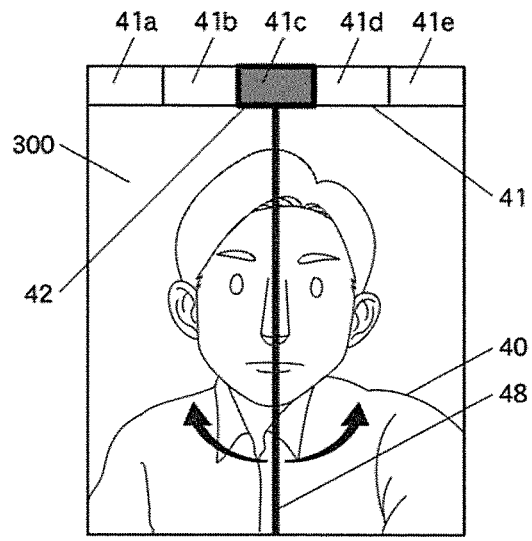
FIG. 14(a) to FIG. 14(c) illustrate an example of the rotation guide image displayed on the display section of the smartphone.
Figure 14B:
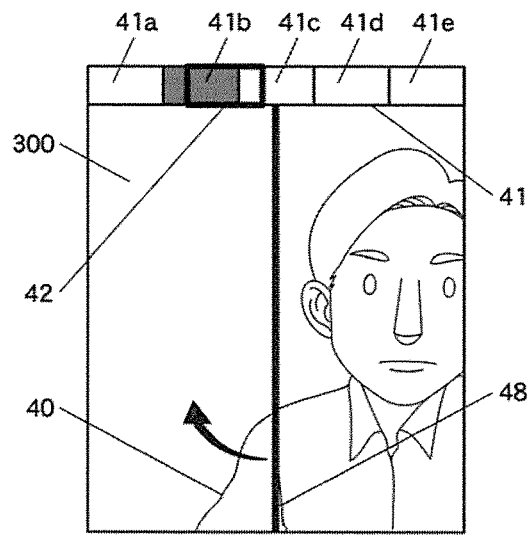

FIG. 14(a) and FIG. 14(b) illustrate an example of the guide display in which the rectangular rotation guide and the rotation axis centered on the smartphone 2 are displayed.

Figure 14C:
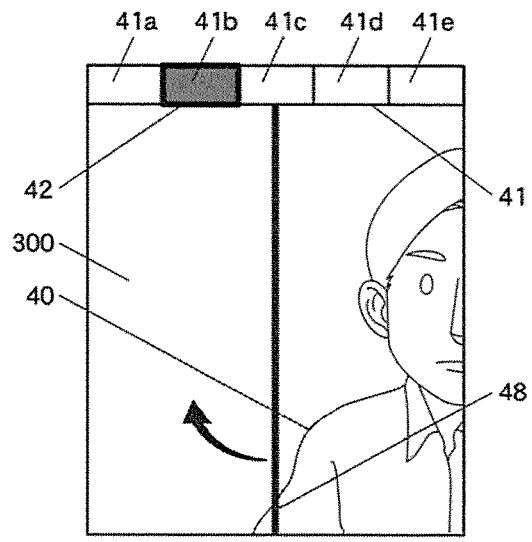

FIG. 14(*a*) illustrates a state in which the user aims the front camera 62 of the smartphone 2 at himself/herself to capture a selfie. In the example of FIG. 14(*a*), a straight line indicating the rotation axis 48 is displayed on the vertical center line of the display section 300. Further, in order to make the user aware of the rotational movement, arrow arcs are displayed around the center axis 48. In the upper end of the display section 300, the rotation guide that is composed of the horizontally long rectangular rotation guide units 41*a* to 41*e* and the rotation marker 42 are displayed as illustrated in FIG. 14(*a*). FIG. 14(*b*) illustrates a state in which the user is rotating the smartphone 2 toward the position of the rotation guide unit 41*b*. FIG. 14(*c*) illustrates a state in which the user has rotated the smartphone 2 to the position of the rotation guide unit 41*b*.

It is preferred that the appearance rotation guide 45 and the arrow indicating the rotational direction as illustrated in FIG. 11(*b*) are further displayed on the center axis 48. Further, the center guide 43 and the center marker 44 may be displayed at any location on the rotation axis.

It is not necessary to display the center axis 48 over the entire display section 300 of the smartphone 2 in the vertical direction as illustrated in FIG. 14(*a*) to FIG. 14(*c*). For example, it may be displayed only within a predetermined upper area. Alternatively, the center axis 48 and the solid arrow arc may be displayed inside the rotation guide 41, e.g. inside the rotation guide unit 41C. A solid straight arrow indicating the rotational direction may be displayed instead of the solid arrow arc.

With this configuration, the user can clearly understand to rotate the smartphone 2 to capture images.

(Rectangular Rotation Guide, Imaging Area Marker and Photographed Image)

In the above-described examples, the guide display is a combination of the rotation guide 41 and the rotation marker 42. Instead, an imaging area marker 46 indicating the imaging area and a reduced image 47 of a photographed image may be displayed as the rotation guide 41. An example of such a guide display will be described using FIG. 15(*a*) and FIG. 15(*b*).

FIG. 15(*a*) illustrates the imaging stand-by screen when the first image (front face selfie of the user) is captured. In the example of FIG. 15(*a*), the rotation guide 41 that is composed of the vertically long rotation guide units 41*b* to 41*d* and the imaging area marker 46 are displayed in the upper right part of the display section 300. The imaging area marker 46 is overlaid on the rotation guide unit 41*c* disposed in the middle of the rotation guide 41, and the reduced image 47 of the first image (front face selfie of the user) that has been captured at the position of the rotation guide unit 41*c* is displayed in the rotation guide unit 41*c*. Further, the appearance rotation guide 45 as illustrated in FIG. 11(*b*) is displayed below the rotation guide 41.

The imaging area marker 46 indicates the current imaging area of the front camera 62 and the current rotation status of the smartphone 2. The imaging area marker 46 moves to the right or left within the rotation guide 41 according to the imaging direction. Further, while the user is rotating the smartphone 2, the shape of the imaging area marker 46 is changed from a rectangle to a trapezoid according to the rotational direction and the rotation angle of the smartphone 2. Then, when the user has rotated the smartphone 2 to the next imaging direction, the shape returns to a rectangle.

The aspect ratio of the rotation guide unit 41*c* corresponds to the aspect ratio of the photographed image, which is preferably the same aspect ratio. The horizontal width of the rotation guide units 41*b*, 41*d* that are disposed respectively on the left and right sides of the rotation guide unit 41*c* may be either the same as that of the rotation guide unit 41*c* or narrower than that of the rotation guide unit 41*c* as illustrated in FIG. 15(*a*) to FIG. 15(*c*).

Along with the appearance rotation guide 45, a solid arrow arc indicating the next rotational direction is displayed. The solid arrow arc indicating the next rotational direction may be displayed inside the rotation guide 41. A straight arrow may be displayed instead of the arrow arc.

Further, it is preferred that a text message that prompts the user to rotate the smartphone 2 in the right or left direction is displayed on the display section 300. As with the example of FIG. 5(*b*), after an image is captured at the position of the rotation guide unit 41*c*, the rotation guide units 41*b*, 41*d* may be highlighted by hatching so that the user is notified of the next imaging direction.

FIG. 15(*b*) illustrates the imaging stand-by screen when the user is rotating the smartphone 2 in order to capture the second image at the position of the rotation guide unit 41*b*. The imaging area marker 46 is deformed from a rectangle to a trapezoid according to the rotational direction and the rotation angle of the smartphone 2. Further, the appearance rotation guide 45 is inclined according to the rotational direction and the rotation angle of the smartphone 2, and an arrow (left arrow in this state) indicating the current rotational direction is added thereto. It is preferred that a text message that prompts the user to continue the rotation is displayed in the display section 300 until the smartphone 2 reaches the next imaging direction.

Then, FIG. 15(*c*) illustrates the imaging stand-by screen when the second image is captured. The imaging area marker 46 returns from a trapezoid to a rectangle and moves to the left according to the rotational direction and the rotation angle of the smartphone 2. Further, the reduced image 47 of the second image (captured at the position of the rotation guide unit 41*b*) is displayed in the imaging area marker 46. Since the reduced image 47 of a photographed image is displayed in the rotation guide 41 as described above, the user can capture a panoramic image while visually checking the overlap of the imaging areas without moving his/her eyes from the rotation guide 41.

In the state of FIG. 15(*c*), an arrow (right arrow in this case) indicating the next rotational direction is displayed along with the appearance rotation guide 45. It is preferred that a text message that prompts the user to rotate the smartphone 2 in the opposite direction is further displayed in the display section 300. As with the example in FIG. 9(*d*), after the second image is captured, the rotation guide unit 41*d* may be highlighted by hatching so that the user is notified of the next imaging direction.

The display location of the rotation guide 41 is not limited to the upper right part of the display section 300. It may be displayed anywhere in the display section 300 such as the upper center part, the upper left part or the like. Further, the center guide 43 and the center marker 44 may be further displayed at the center of the display section 300.

(Imaging Direction with Reference to User)

In the above-described examples, the rotation guide 41 and the rotation marker 42 indicate the direction of the smartphone 2 (direction and degree of rotation) from the perspective of the user with reference to the smartphone 2. Further, the image displayed in the imaging stand-by screen is a mirror image. Alternatively, the rotation guide may be displayed with reference to the user, in which the display of the photographing subject changes according to the direction of the smartphone 2. An example of such rotation guides will be described using FIG. 16(*a*) to FIG. 16(*c*).

Figure 16A:
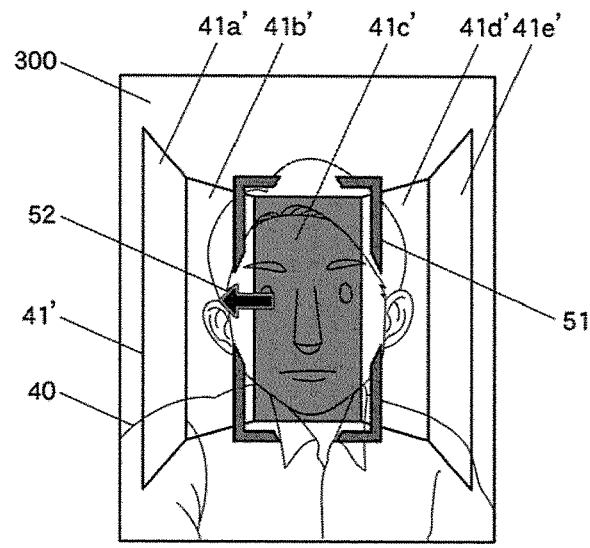
FIG. 16(a) to FIG. 16(c) illustrate an example of the rotation guide image displayed on the display section of the smartphone.
Figure 16B:
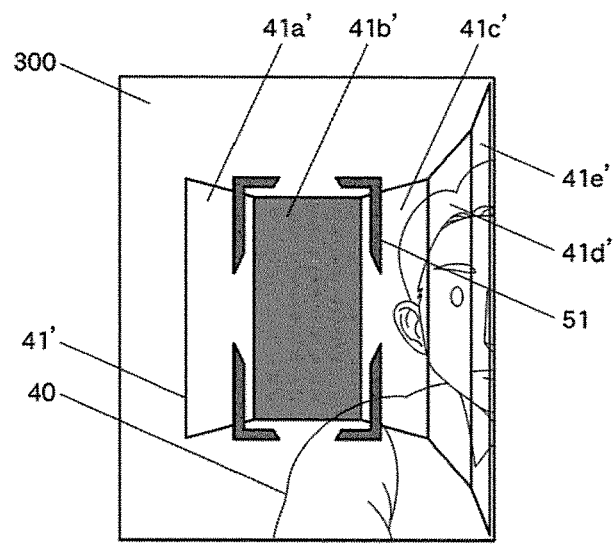
Figure 16C:
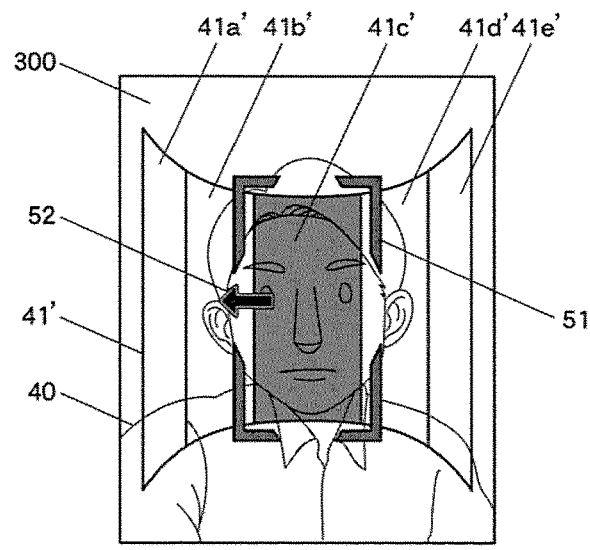

FIG. 16(*a*) illustrates a state when the first image is captured. A marker 51 is displayed in the shape of a partial rectangular frame (partial rectangular outline with a certain width), and the center thereof is fixed on the center of the display section 300. A rotation guide 41' is composed of rectangular rotation guide units 41*a'* to 41*e'*, and the whole rotation guide unit 41' moves in the lateral direction according to the rotation of the smartphone 2. FIG. 16(*a*) illustrates a state in which a rotation guide unit 41*c'* in the middle of the rotation guide units 41*a'* to 41*e'* is highlighted by hatching that indicates the photographing position. An arrow 52 indicating the next photographing direction (rotation guide unit 41*b'* in the illustrated state) may be further displayed. In contrast to the examples in FIG. 5(*a*) to FIG. 10(*b*), the rotation guide units are arranged such that the rotation guide units 41*a'*, 41*e'* at the ends are located in the near side of the display screen. The image displayed in the imaging stand-by screen is a horizontally reversed image of the image in the examples in FIG. 5(*a*) to FIG. 14(*c*).

After capturing the first image, the user rotates the smartphone 2 so as to bring the rotation guide unit 41*b'* within the marker 51. According to the rotation of the smartphone 2, the rotation guide 41' moves in the lateral direction (to the right in this case). In the rotation guide unit 41*b'*, the photographing subject (a scene to be captured by the front camera 62) that is to be photographed when the smartphone 2 is rotated to the photographing position of the rotation guide unit 41*b'* is displayed beforehand. Therefore, while rotating the smartphone 2, the user can understand the next image to be captured beforehand by visually checking the image displayed in the rotation guide unit 41*b'*.

FIG. 16(*b*) illustrates a state when the second image is captured. The user rotates the smartphone 2 and captures the second image when the rotation guide unit 41*b'* is brought within the marker 51. The third and later images are captured in the same way. FIG. 16(*c*) illustrates a variation of the rotation guide unit 41' in FIG. 16(*a*), in which the upper and lower outlines thereof are in the shape of an elliptic arc.

Compared to the display manner of the rotation guide in the examples in FIG. 5(*a*) to FIG. 14(*c*), this configuration can reduce the probability of a user misunderstanding that he/she has to swing the smartphone around a subject in order to capture images. Further, this configuration enables the user to see the images to be captured before the actual images are captured.

In the examples of FIG. 16(*a*) to FIG. 16(*c*), the current location marker as in the examples of FIG. 5(*a*) to FIG. 14(*c*) is not displayed. As described above, this is because the image displayed in the imaging stand-by screen in FIG. 16(*a*) to FIG. 16(*c*) is a horizontally reversed image of the image in the examples of FIG. 5(*a*) to FIG. 14(*c*). Specifically, if the current location marker were displayed in the example in FIG. 16(*a*) to FIG. 16(*c*) for the purpose of correcting the horizontal location of the smartphone 2, the user would be confused since the current location marker moves in the opposite direction to the actual movement of the smartphone 2. Therefore, the current location marker may be omitted. Alternatively, the current location marker can preferably be replaced by displaying the information necessary to correct the location of the smartphone 2 as a figure such as an arrow indicating the direction of correction, a text such as "RIGHT" or "LEFT", or a numerical information indicating the distance for correcting the location.

The smartphone 2 may be configured such that when it is deviated in the vertical direction during the rotation, the rotation guide 41' is displayed in a location deviated from the guide 51. Further, the smartphone 2 may be configured such that when the smartphone is deviated in the horizontal direction, the entire rotation guide 41' or the corresponding rectangular rotation guide unit is deformed (e.g. distorted into a trapezoid).

In the above description, examples are provided for the display manner and display location of the photographing guide. However, the smartphone 2 may be configured such that the user can select the type, the combination and the display location of the photographing guide on a menu displayed on the display section 300, for example.

In the above-described examples, the smartphone 2 is rotated evenly in both the right and left direction with reference to the first photographed image as the center. However, the configuration of the examples is not limited thereto. For example, the panoramic imaging area may be set by providing a step in which the second and later images are selected to be captured only at the right or left side of the user. When the user selects to capture only images at the left side, only the rotation guide units 41*a* to 41*c* are displayed, and the rotation guide units 41*d*, 41*e* are hidden. Alternatively, a "reduce photographing area (finish photographing now)" icon may be displayed on the touch panel 250. For example, after the images in the area corresponding to the rotation guide units 41*a* to 41*c* are captured, the user can touch the icon to finish the photographing so that a panoramic image is generated. Further, the smartphone 2 may be configured such that a tap operation on the individual rotation guide units causes them to be hidden or displayed.

In the above-described examples, the area (panoramic imaging area) corresponding to the rotation guide 41 set in A15 is captured. However, the configuration of the examples is not limited thereto. For example, a step may also be provided to allow the user to select whether to capture images of a wider area than the area corresponding to the rotation guide 41.

For example, in the example of FIG. 5(*a*), the smartphone 2 may be configured such that the imaging control section 150 displays a selection menu that makes the user select whether to expand the photographing area in the case that the user further rotates the smartphone 2 in the same direction after he/she rotates the smartphone 2 and captures an image at the position of the rotation guide unit 41*a*. When the user selects to expand the photographing area, the rotation guide 41 is updated so that another rotation guide unit is added on the corresponding side. At the same time, the information on the number of shots required is updated.

Alternatively, after an image corresponding to either end of the rotation guide 41 is captured, an "expand photographing area" icon is displayed on the touch panel 250. The user can perform a touch operation on the icon so that the imaging control section 150 updates the rotation guide 41 and adds another rotation guide unit.

Alternatively, when the user further rotates the smartphone 2 in the direction of the expansion of the panoramic imaging area after an image corresponding to either end of the rotation guide 41 is captured, the imaging control section 150 determines that the photographing area is expanded based on an output from the motion sensor 760. The imaging control section 150 then automatically updates the rotation guide 41 and adds another rotation guide unit on the corresponding side.

In the above-described examples, the photographing is performed according to the photographing area (panoramic imaging area) and the number of shots that are set in A15. However, the configuration of the examples is not limited thereto. For example, the smartphone 2 may be configured to reset the photographing area and the number of shots when it detects the rotational direction thereof is reversed.

Specifically, in the example in FIG. 5(a), for example, suppose that the user reverses the rotation of the smartphone 2 after he/she captures images corresponding to the rotation guide units 41c, 41b. In this case, the imaging control section 150 detects that the user reverses the rotation of the smartphone 2 by means of the motion sensor 760, and determines that the user has canceled the capture of an image corresponding to the rotation guide unit 41a. The imaging control section 150 then updates the rotation guide 41 and notifies the user of the rotation guide unit 41d on the other side as the next photographing position. When the rotation guide unit 41a is canceled, the rotation guide unit 41e at the symmetrical position on the other side may also be canceled.

While the photographing area may be reduced as described above, it may also be expanded in a similar way. For example, suppose that after the user captures images corresponding to the rotation guide units 41c, 41b, 41a, he/she further rotates the smartphone 2 in the same direction. In this case, the imaging control section 150 determines that an image at the position beyond the rotation guide unit 41a is to be additionally captured. The imaging control section 150 then updates the rotation guide 41 and adds another rotation guide unit to the left side of the rotation guide unit 41a. The addition of another rotation guide unit is repeated until the user reverses the rotational direction of the smartphone 2. When the imaging control section 150 detects that the user reverses the rotation of the smartphone 2 by means of the motion sensor 760, it determines that the user has finished capturing the images on the side of the rotational direction and notifies him/her of the rotation guide unit 41d as the next photographing position. Further, the same number of rotation guide units as the number of images added to the left side of the rotation guide unit 41a may be added to the other side at the symmetrical position.

In the above-described examples, the photographing is performed according to the photographing area and the number of shots that are set in A15. However, the configuration of the examples is not limited thereto. For example, the smartphone 2 may be configured to display a guide corresponding to only a single unit rotation angle, i.e. only a single rotation guide unit when the first image is captured, and thereafter to add other rotation guide units according to a user operation so as to expand the photographing area.

For example, in the example in FIG. 5(a), only the single rotation guide unit 41c corresponding to a single unit rotation angle (e.g. 30 degrees) is set as the rotation guide 41 in the setting of A15. In this case, the unit rotation angle is the only information required to set and display the guide. Then, suppose that the user rotates the smartphone 2 to the left after capturing the first image in the corresponding position. The imaging control section 150 detects that the user rotates the smartphone 2 by means of the motion sensor 760, and determines that the number of shots is increased. The imaging control section 150 then updates the rotation guide 41 to add the rotation guide unit 41b to the left side of the rotation guide unit 41c. The rotation guide unit 41a on the left and the rotation guide units 41d, 41e on the right may be added in a similar way. The determination of whether to terminate the photographing (A45) may be made according to a user operation on an operation button or the like.

In order to make the user aware of the rotational movement of the smartphone 2, the outline of an annular sector (inner angle of 150 degrees) may be displayed as the rotation guide 41 along with the rotation guide unit 41c corresponding to the photographing position of the first image in the step of determining the guided selfie photographing mode (A10, Yes) or the step of setting the guided selfie photographing (A15).

Alternatively, no guide unit may be displayed at the start of the photographing. Then, after the first image is captured, a rotation guide unit corresponding to the photographed area (rotation guide unit 41c in this case) may be displayed.

In the above description, the first image is captured at the position of the rotation guide unit 41c. Instead, the first image may be captured at the position corresponding to a different rotation guide unit.

In the above-described examples, photographed images (five images in the above description) captured in the guided selfie photographing mode are used for generating a panoramic image. However, it is not necessary to use all of the photographed images to generate a panoramic image.

For example, after capturing five images corresponding to the rotation guide units 41a to 41e in the guided selfie photographing mode, the user checks the photographed images in the step of displaying the photographed images (A40). In this step, suppose that the user wants to exclude the photographed image corresponding to the rotation guide unit 41a from the target images for generating a panoramic image. To achieve this, a step of allowing the user to select images to be used in the step A55 of generating a panoramic image from among the photographed images may be added between the step of displaying the photographed images (A40) and the step of generating a panoramic image (A55).

Further, to generate a better panoramic image, the smartphone 2 may be configured such that it can repeat the photographing in the guided selfie photographing mode for multiple times (e.g. twice in a row), and the user can select photographed images to be used for generating a panoramic image from among a plurality of photographed images with respect to each of the rotation guide units. In this case, for example, the user can select the photographed image captured in the first photographing as the image corresponding to the rotation guide units 41b to 41e and the one captured in the second photographing as the image corresponding to the rotation guide unit 41a so that a panoramic image is generated.

(Hand Switch Assist)

When the user holds the smartphone 2 in his/her right hand, it is more difficult to rotate it in the right direction than in the left direction. Further, when the user forces himself/herself to rotate the smartphone by a large angle, it is highly probable that the arm holding the smartphone 2 unfavorably is shifted in the vertical or horizontal direction. To prevent this, for example, a notification that prompts the user to switch the hand holding the smartphone 2 from the right hand to the left hand may be made when the images on the left side of the user have been captured. For example, it is preferred that a "Switching hand . . . " icon is displayed on the touch panel 250 so that the user can suspend or resume the guided selfie photographing mode by performing a touch operation on the icon when he/she switches his/her hand from the right hand to the left hand.

(Rotation Speed Limit)

Since the motion information of the smartphone 2 is detected by means of the motion sensor 760, the measurement error is likely to increase when the smartphone 2 is rotated at a predetermined speed or less. Further, as the rotation time increases, there will be more fatigue in the arm of the user holding the smartphone 2, and the arm position may erroneously be deviated downward due to the fatigue. To cope with this problem, a notification may be made to the user in the imaging stand-by screen when rotation to the next imaging direction is not detected or when the next image is not captured for a predetermined period of time (e.g. 10 sec) after an image is captured. Alternatively, the guided selfie photographing mode may be automatically cancelled.

(Setting of Panoramic Imaging Area)

Figure 17A:
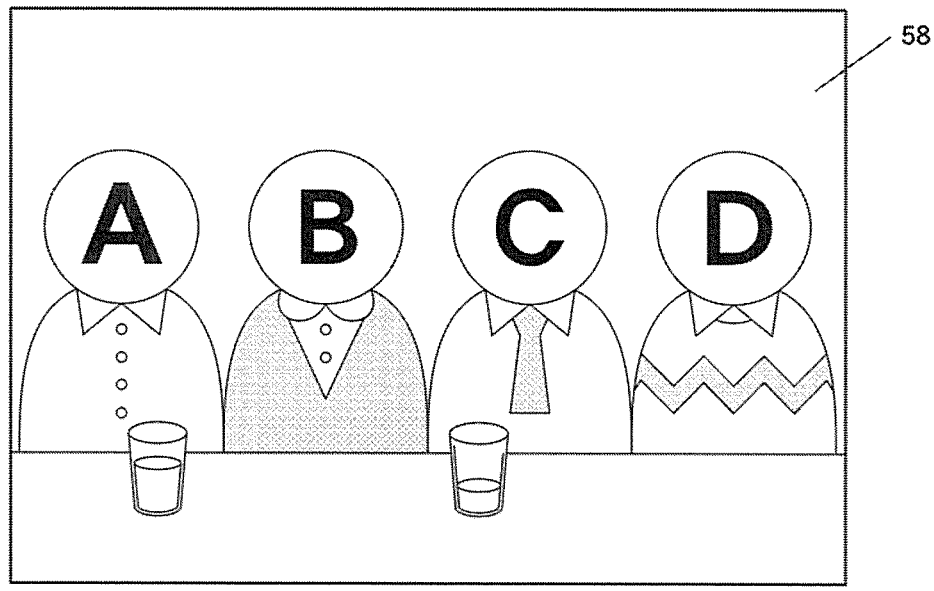
FIG. 17(a) to FIG. 17(d) are explanatory views of an example of setting an imaging area in a guided selfie photographing mode.

Suppose that the user wants a panoramic composite image 58 of four persons A to D in a line as illustrated in FIG. 17(a), in which the person C is the user and also who is operating the camera. An example of setting the panoramic imaging area in this case before the actual photographing will be described.

To set the panoramic imaging area, a step of setting the panoramic imaging area and making a notification may be added between the step of determining the guided selfie photographing mode (A10, Yes) and the step of setting the guided selfie photographing (A15). It is useful to further add a step of performing face area detection before the step of setting the panoramic imaging area.

Figures 17B, 17C, 17D:
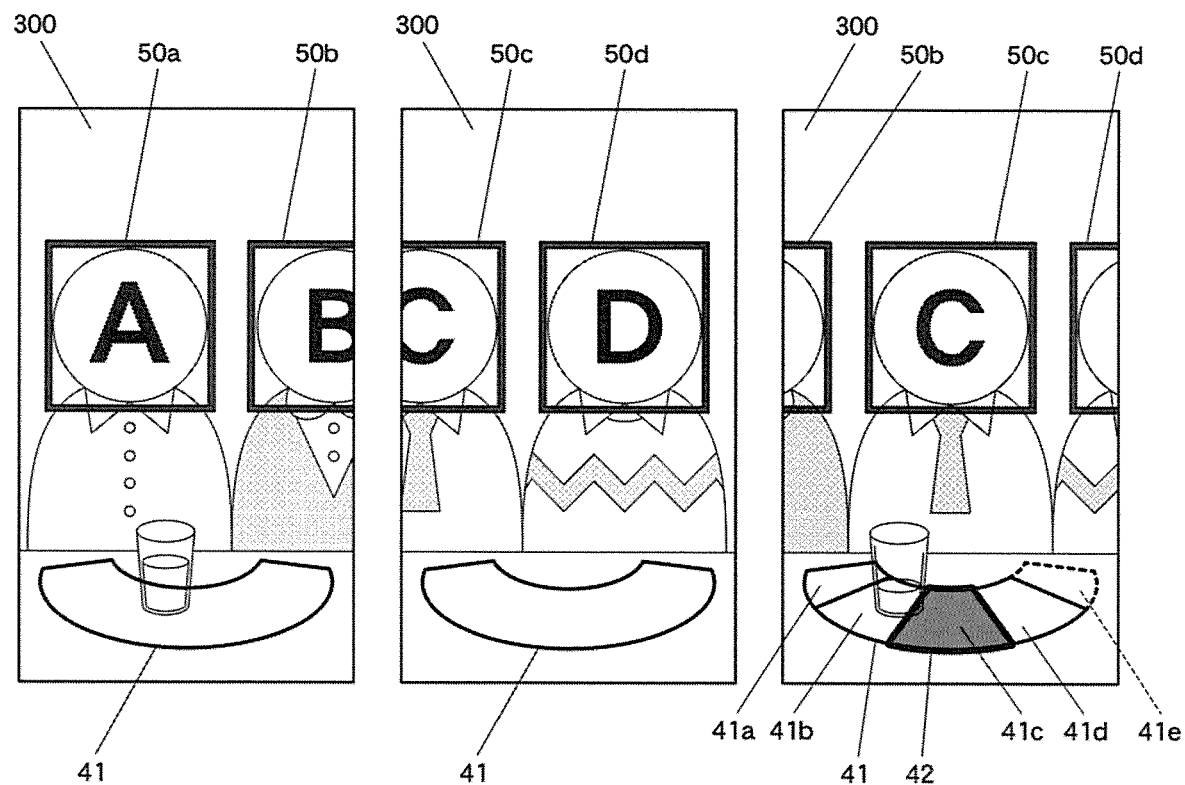

FIG. 17(b), FIG. 17(c) and FIG. 17(d) illustrate an example of the imaging stand-by screen displayed on the display section 300 while the person C rotates the smartphone 2, in which face areas 50a, 50b, 50c and 50d are respectively face areas of the persons A, B, C and D detected by the face area detection. The rotation guide 41, the rotation guide units 41a to 41e and the rotation marker 42 are displayed after the panoramic imaging area is set as described below (FIG. 17(d)). Alternatively, in order to prompt the user to rotate the smartphone 2, an annular sector frame of the rotation guide 41 may be tentatively displayed at an angle of, for example, 150 degrees as illustrated in FIG. 17(b) and FIG. 17(c) before the panoramic imaging area is set.

To set the panoramic imaging area, the user rotates the smartphone 2 such that the area that he/she wants to photograph as the panoramic composite image (persons A to D in the example in FIG. 17(a) to FIG. 17(d)) is included in the imaging area, and the imaging control section 150 sets the panoramic imaging area based on the information on the angle of the rotation made by the user.

First, the user rotates the smartphone 2 until a desired scene is shown in the imaging stand-by screen including the face area 50a of the person A at the left end, and this position is held for a predetermined period of time (e.g. 2 sec) (FIG. 17(b)). This position is referred to as a first end of the panoramic imaging area. In this step, a notification such as "Rotate the smartphone 2 to either end and hold for 2 secs" may be made.

The motion sensor 760 detects the rotation angle to the first end of the panoramic imaging area of the smartphone 2 and outputs it to the imaging control section 150. Thereafter, it detects that the smartphone 2 is not rotated or shifted for a predetermined period of time (2 secs in this case) and outputs a signal that indicates completion of setting the first end to the imaging control section 150.

Then, the user rotates the smartphone 2 until a desired scene is shown in the imaging stand-by screen including the face area 50a of the person D at the right end, and the position of the smartphone is held for a predetermined period of time (e.g. 2 sec) (FIG. 17(c)). This position is referred to as a second end of the panoramic imaging area. In this step, a notification such as "Rotate the smartphone 2 to the other end and hold for 2 secs" may be made. The motion sensor 760 detects the rotation angle to the second end of the panoramic imaging area of the smartphone 2 and outputs it to the imaging control section 150. Thereafter, it detects that the smartphone 2 is neither rotated nor shifted for a predetermined period of time (2 secs in this case) and outputs a signal that indicates completion of setting the second end to the imaging control section 150.

Instead of holding the position of the smartphone 2 for the predetermined period of time after rotating it, the smartphone 2 may be configured such that the user can set the first and second ends by a user operation such as pressing an operation button or the like. Alternatively, the first and second ends may be set when the motion sensor 760 detects that the smartphone 2 is rotated in one direction and then rotated in the opposite direction, and outputs that information to the imaging control section 150.

Continuing with A15, the imaging control section 150 sets the panoramic imaging area based on the information on the rotation angle to the first end and the second end. The guide display setting section 180 displays the rotation guide 41, the rotation guide units 41a to 41e and the rotation marker 42 on the display section 300 based on the information output from the imaging control section 150 (FIG. 17(d)).

In this step, as illustrated in FIG. 17(d), the center of the rotation guide 41 (center of the panoramic imaging area) is aligned with the vertical center line of the face area 50c of the person C who is operating the camera. Since the persons A and B are on the left and the person D is on the right of the person C, the rotation guide 41 is asymmetrical. That is, the rotation guide units 41a to 41d are displayed, but the rotation guide unit 41e that is not included in the panoramic imaging area is not displayed. Alternatively, as illustrated in FIG. 17(d), the rotation guide unit 41e may be displayed in a different display manner from the other rotation guide units 41a to 41d (the rotation guide unit 41e is displayed as a dashed line frame in the illustrated example). Thereafter, the processing of the steps A15 to A55 is performed. The panoramic image 58 is thus generated as a result of the image generation processing (A55).

With this configuration, the user can set the panoramic imaging area that includes a desired plurality of faces before capturing actual images. Further, the user can understand the number of shots required for generating a panoramic image.

(Guided Photographing Mode for Rear Camera)

In the above-described examples, the front camera 62 that is installed in the front face 61 of the housing 60 of the smartphone 2 is used for capturing a selfie or a group photo. However, the guide function of the disclosure is also useful when using the rear camera 72 that is installed in the back face 71 of the smartphone 2.

Hereafter, such a case will be specifically described using FIG. 18(a) to FIG. 20.

Figure 18A:
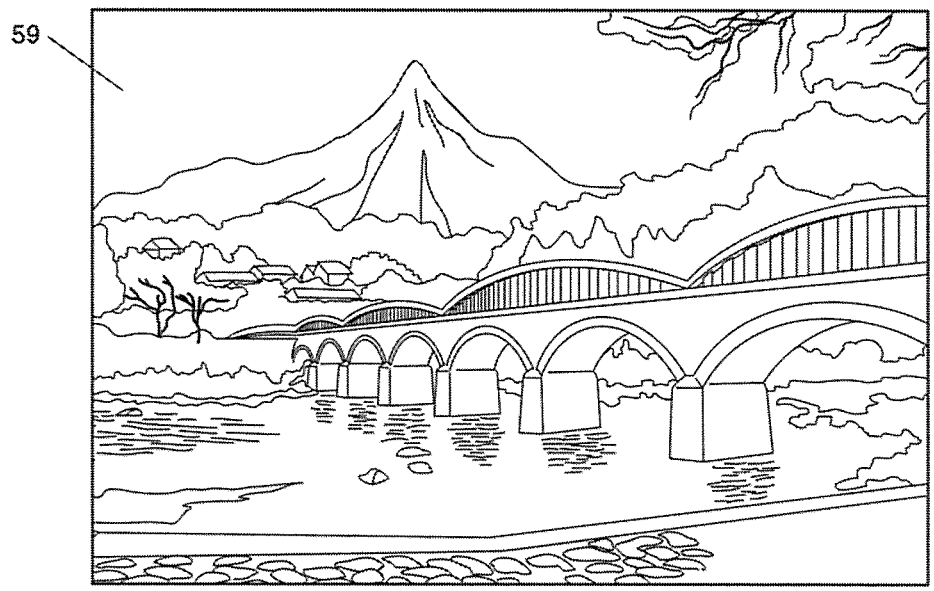
FIG. 18(a) to FIG. 18(d) illustrate an example of the rotation guide image displayed on the display section of the smartphone in a guided photographing mode for a rear camera.

A process for obtaining a wide angle panoramic landscape composite image 59 as illustrated in FIG. 18(a) will be described.

The user frequently uses the rear camera 72 instead of the front camera 62 to capture an image such as the panoramic landscape composite image 59 in which the user, who is operating the camera, is not shown.

To achieve this, a step of selecting a guided photographing mode for the rear camera may be added at the point following the initiation of the camera mode processing. Further, a step may be added of setting guided photographing for the rear camera and displaying and updating a guide for the rear camera, which are performed to replace the step of setting the guided selfie photographing and displaying and updating the guide (A15).

Figures 18B, 18C, 18D:
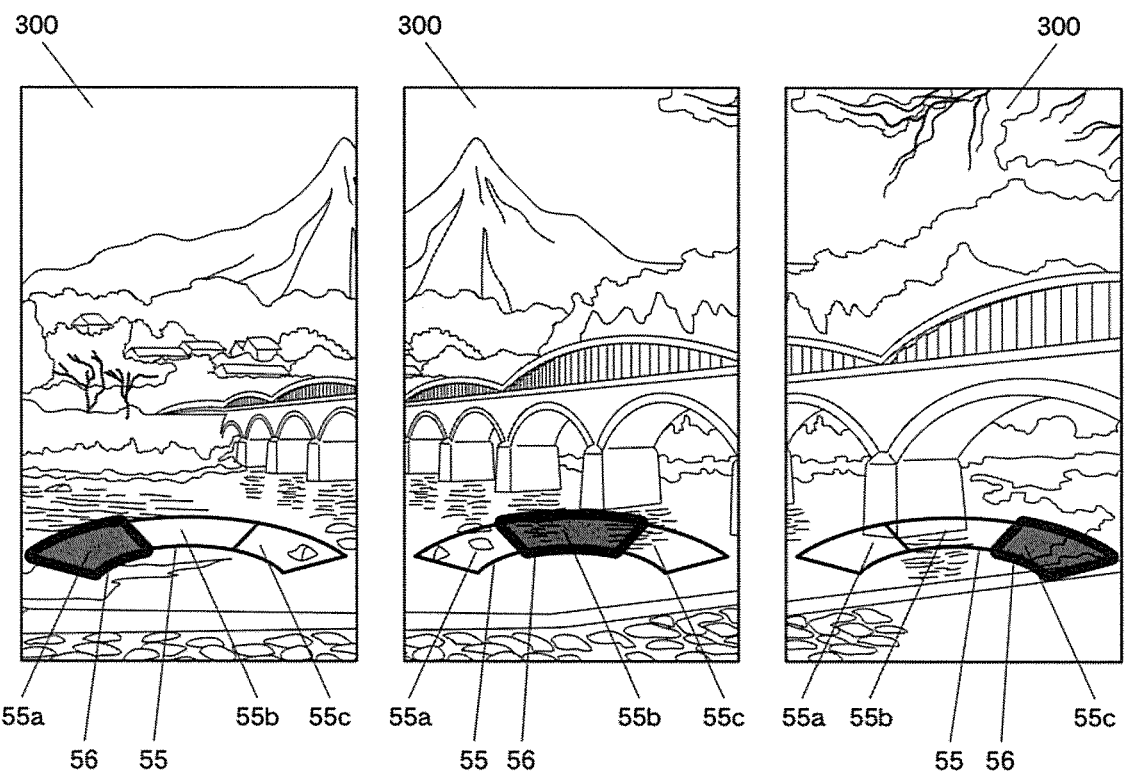

FIG. 18(b) illustrates a state when the first image is captured in the guided photographing mode for the rear camera. A rotation guide 55 is in the shape of an annular sector that is curved oppositely to the guide for the front camera 62. That is, the rotation guide 55 bulges toward the far side in the display screen. As in the guided selfie photographing mode, the user captures the first image at the position of the rotation guide unit 55*a* that is highlighted by hatching as illustrated in FIG. 18(*b*) according to the rotation guide 55, rotation guide units 55*a* to 55*c* and a rotation marker 56. Subsequently, the user rotates the smartphone 2 to the photographing positions corresponding to the rotation guide units highlighted by hatching as illustrated in FIG. 18(*c*) and FIG. 18(*d*) and captures the second and third images respectively. The wide angle panoramic landscape composite image 59 as illustrated in FIG. 18(*a*) can be obtained as a result of the subsequent image generation processing (A55).

(Setting of Panoramic Imaging Area for Rear Camera)

Figure 19A:
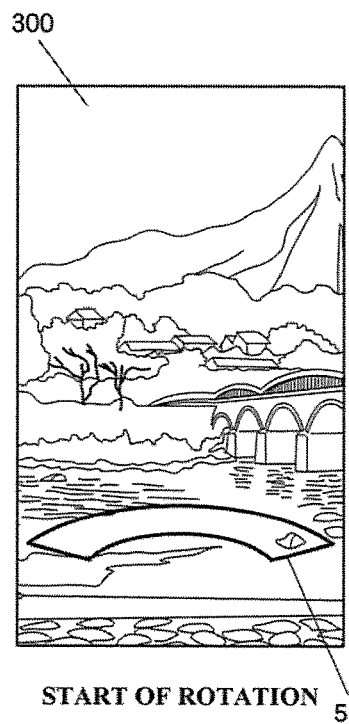
FIG. 19(a) to FIG. 19(c) are explanatory views of an example of setting an imaging area in the guided photographing mode for the rear camera.
Figure 19B:
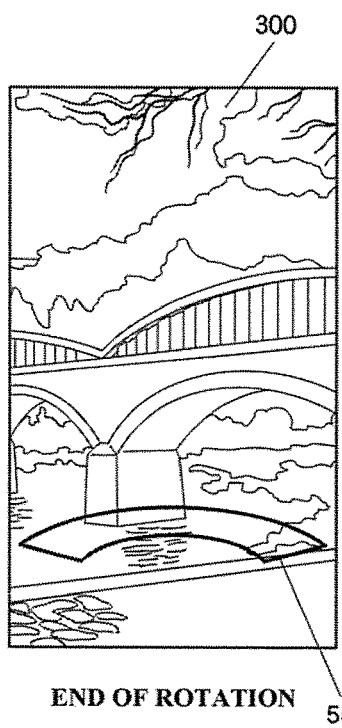
Figure 19C:
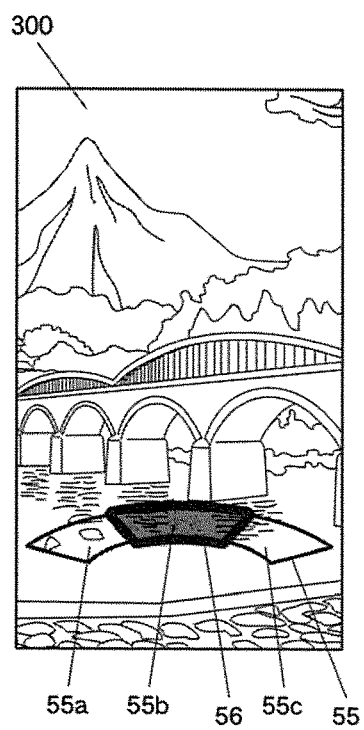

FIG. 19(*a*) to FIG. 19(*c*) illustrate an example in which the setting of the panoramic imaging area in the guided selfie photographing as described with FIG. 17(*a*) to FIG. 17(*d*) is applied to the guided photographing mode for the rear camera.

The user rotates the smartphone 2 until a desired position in which the left end image of a panoramic composite image to be generated is shown, so as to set the first end (FIG. 19(*a*)). Then, the user rotates the smartphone 2 until a desired position in which the right end image of a panoramic composite image to be generated is shown, so as to set the second end (FIG. 19(*a*)). Continuing with A15, the imaging control section 150 sets the rotation guide 55 based on the information on the rotation angles to the first and second ends (FIG. 19(*c*)).

(Guided 360-Degree Photographing Mode)

Figure 20:
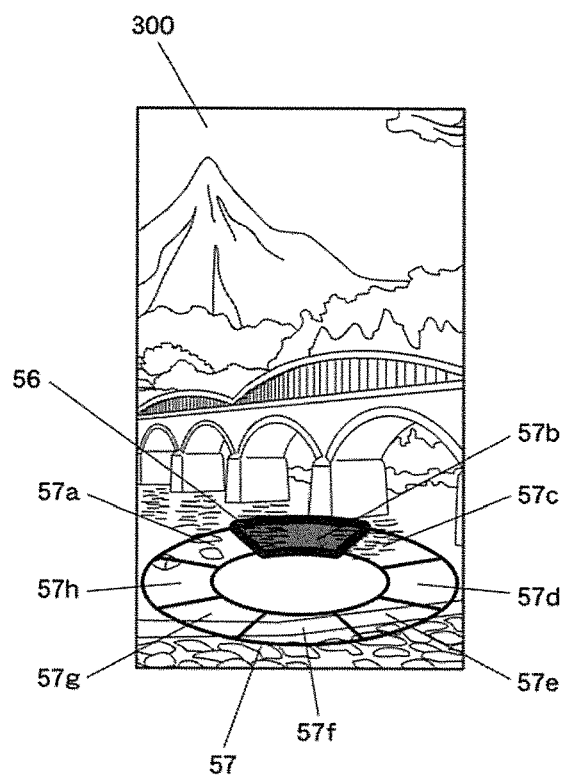
FIG. 20 illustrates an example of a rotation guide image displayed on the display section of the smartphone in a guided all-around photographing mode.

FIG. 20 illustrates an example of a guide display for capturing images of all directions (360 degrees) around the user who is operating the camera by using the rear camera 72 and the front camera 62 together and generating a 360-degree panoramic composite image.

To achieve this, a step of selecting a guided 360-degree photographing mode may be added after the camera mode processing is started.

In the guided 360-degree photographing mode, the user captures images in both the guided selfie photographing mode and the guided photographing mode for the rear camera, and thereafter the processing section 100 performs the image generation processing (A55) according to the image generating program 811 stored in the memory section 800, so that the 360-degree panoramic image is generated.

When capturing images on the opposite side from the user, he/she uses the rear camera 72 and rotates the smartphone 2 according to the rotation guide units 57*a* to 57*c*.

When capturing images on the user side, he/she uses the front camera 62 and rotates the smartphone 2 according to the rotation guide units 57*e* to 57*g*.

Regarding the rotation guide units 57*d*, 57*h* that are located in the middle between the user side and the other side, the smartphone 2 may be configured such that the user can select either the front camera 62 or the rear camera 72 beforehand so as the camera to capture images in the corresponding positions. Alternatively, when the smartphone 2 is rotated to the position corresponding to the rotation guide unit 57*d* or 57*h*, the imaging control section 150 makes a notification that prompts the user to switch the camera so that he/she selects the camera to be used.

(Photographing Assist Equipment)

In the above description, the user rotates the smartphone 2 that is held in his/her hand to capture a plurality of images. Instead, the smartphone 2 may be attached to a fixing portion with a rotation mechanism of photographing assist equipment, and the smartphone 2 may be rotated by the rotation of the fixing portion. For example, the user fixes the smartphone 2 on the fixing portion with the rotation mechanism of the photographing assist equipment by means of a jig or the like. Then, the user operates a remote or the like to rotate or hold the fixing portion of the photographing assist equipment while visually checking the rotation guide 41 displayed on the display section 300 of the smartphone 2. The motion sensor 760 of the smartphone 2 detects the rotation and hold and constantly outputs the detection result to the imaging control section 150. The photographing is automatically performed when the imaging control section 150 detects that the smartphone 2 is rotated by a predetermined rotation angle and then held for a predetermined period of time (e.g. 1 sec) and then outputs an imaging command signal to the imaging section 500 of the smartphone 2. Alternatively, the user may manually capture images by operating an operation button of the smartphone 2 and the remote while visually checking the rotation guide 41 and the rotation marker 42.

Alternatively, a setting for repeating a rotation by a predetermined angle and a hold predetermined times may be stored in the control section of the photographing assist equipment beforehand, so that the fixing portion of the photographing assist equipment automatically repeats the rotation and hold for the predetermined times. In this case, the user activates the photographing assist equipment to which the smartphone 2 is attached. Then, the fixing portion of the photographing assist equipment automatically performs the preset rotation by the predetermined angle and the preset hold for a predetermined period of time. The motion sensor 760 of the smartphone 2 detects the rotation and hold, and the imaging control section 150 outputs a photographing command.

Alternatively, the processing section 100 of the smartphone 2 may output information on the rotational direction, the unit rotation angle, the photographing area and the like to a control section of the photographing assist equipment. Based on the information, the control section of the photographing assist equipment drives the fixing portion to perform the rotation and hold.

Examples of such photographing assist equipment include desktop devices, devices to be mounted on a monopod or a tripod, devices to be connected to a selfie stick and the like. However, it should be understood that the photographing assist equipment is not limited thereto.

With the photographing assist equipment, it is possible to limit the movement of the smartphone 2 to a rotational movement and thereby to avoid a failure of the photographing due to a parallel shift in the vertical or horizontal direction or the like.

In the above-described examples, visual notifications are made to the user. However, the notification manner in the examples is not limited thereto. Examples of the notification include vibration of the smartphone 2 by means of the vibrating section 750 of the smartphone 2, voice navigation by means of the sound output section 400 of the smartphone 2, combinations thereof and the like.

3. VARIATIONS

Examples of the disclosure are not limited to the above-described examples, and suitable changes can be made without departing from the features of the disclosure. Hereinafter, variations will be described, in which the same reference signs are denoted to the same components as those of the examples, and the repetitive description is omitted.

[3-1. Electronic Device]

The image processing device 1 may be installed in electronic devices such as smartphones, cameras, digital cameras, tablets, PDAs and personal computers. The image processing device 1 of the disclosure can be installed in a variety of electronic devices that include an imaging section.

The user can operate the smartphone 2 so as to display the composite image on a display section of another electronic device (information processing device) as well as on the display section 300. Specifically, for example, the user connects the smartphone 2 to a personal computer. Then, the user operates the smartphone 2 to send the composite image displayed on the display section 300 to the personal computer. The personal computer displays the composite image transmitted from the smartphone 2 on a display, and the user views the composite image in the display screen of the personal computer.

In this case, the configuration may be such that the smartphone 2 sends a set of image data of the photographed images captured by the smartphone 2 to the personal computer, and the personal computer generates the composite image instead of the smartphone 2 and displays it on the display of the personal computer. In this case, the combination of the smartphone 2 and the personal computer serves as the image processing device 1 of the disclosure.

[3-2. Recording Medium]

In the above-described embodiment, a variety of programs and data related to image generation is stored in the memory section of the image processing device 1, the memory section 800 of the smartphone 2 or the like, and the processing section reads out and executes the programs so as to perform the image processing of the embodiment. In this regard, the memory section of each device may include a recording medium (external storage) such as a memory card (SD card), a COMPACT FLASH (registered trademark), a memory stick, a USB memory, a CD-RW (optical disk) and an MO (magneto-optic disk) in addition to an internal storage such as a ROM, an EEPROM, a flash memory, a hard disk and a RAM, and the above-described programs and data may be stored in the recording medium.

Figure 21:
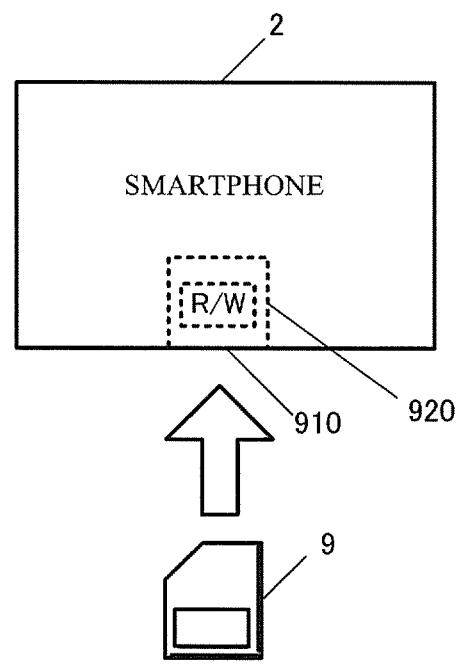
FIG. 21 illustrates an example of a recording medium.

FIG. 21 illustrates an example of the recording medium in such cases.

The smartphone 2 includes a card slot 910 to which a memory card 9 is inserted and a card reader/writer (R/W) 920 to read/write information from/to a memory card 9 inserted in the card slot 910. The card reader/writer 920 writes the programs and data stored in the memory section 800 to the memory card 9 by a control of the processing section 100. Further, the programs and data stored in the memory card 9 are configured such that an external device (e.g. personal computer) other than the smartphone 2 that reads the programs and data can generate a composite image as described in the above embodiment.

What is claimed is:

1. An image processing device, comprising:
    a display device configured to display a photographing subject;
    an imaging device configured to photograph the photographing subject;
    a first motion sensor configured to detect a rotational direction and a degree of rotation of the imaging device; and
    a processor electrically connected to the display device, the image device and the first motion sense and configured to:
    display a guide on the display device, for photographing the photographing subject from different imaging directions as the guide indicates the rotational direction of the imaging device relative to a proper rotational direction for photographing a next image of the photographing subject, wherein display the guide on the display device further comprising changing a display manner of the guide according to the rotational direction and the degree of rotation of the imaging device,
    display a supplementary guide simultaneously with the guide for reducing a change in a photographing position on the display device by notifying a deviation of the imaging device in a vertical direction and in a horizontal direction,
    photograph the next image as the guide and the supplementary guide are vertically aligned in the vertical direction of the display device of the image processing device, and stitch together a plurality of images which comprises the next image obtained by photographing the photographing subject from the different imaging directions so as to generate a composite image, wherein the supplementary guide comprises a third image displayed such that a display location does not change according to the direction and the amount of a parallel shift of the imaging device and a fourth image displayed such that a display location changes according to the direction and the amount of the parallel shift of the imaging device.

2. The image processing device according to claim 1, wherein the processor further configures the guide to indicate rotating the imaging device to photograph the photographing subject from the different imaging directions.

3. The image processing device according to claim 1, wherein the guide comprises the first image indicating a total imaging area that is an area to be photographed into the plurality of images for generating the composite image.

4. The image processing device according to claim 3, wherein the first image further indicates the number of the plurality of images required to photograph the total imaging area.

5. The image processing device according to claim 3,
    wherein the guide further comprises a second image indicating a current imaging area, and
    the processor is further configured to change a location of the second image relative to the first image according to the rotational direction and the degree of rotation of the imaging device.

6. The image processing device according to claim 5, wherein the location of the second image relative to the first image indicates the imaging direction with reference to the imaging device.

7. The image processing device according to claim 3,
    wherein the guide further comprises a reduced image of a photographed image, and
    the processor is further configured to change a location of the reduced image relative to the first image according to the rotational direction and the degree of rotation of the imaging device.

8. The image processing device according to claim 5, wherein the location of the second image relative to the first image indicates the imaging direction with reference to a user.

9. The image processing device according to claim 5, wherein when the location of the second image relative to the first image indicates the imaging direction, an image displayed on the display device when indicating the imaging angle with reference to the imaging device and an image displayed on the display device when indicating the imaging angle with reference to a user are horizontally flipped images of each other.

10. The image processing device according to claim 5, wherein the first image is sectioned into a plurality of blocks that correspond to the respective plurality of images required to photograph the total imaging area, and the location of the second image over any one of the blocks indicates the imaging direction.

11. The image processing device according to claim 10, wherein for each of the plurality of blocks, the first image indicates a photographing order corresponding to the block.

12. The image processing device according to claim 3, wherein
the processor is further configured to:
detect a face area of a person displayed on the display device, and
set the first image so that the total imaging area is centered on the face area detected by the processor.

13. The image processing device according to claim 3, wherein
the processor is further configured to detect a face area of a person displayed on the display device, and
when the processor detects a plurality of face areas, the processor is further configured to set the first image so that the total imaging area is centered on one of the detected plurality of face areas.

14. The image processing device according to claim 3, wherein
the processor is further configured to detect a face area of a person displayed on the display device, and
when the processor detects a plurality of face areas, the processor is further configured to set the first image so that the total imaging area includes at least the face areas at both ends among the detected plurality of face areas.

15. The image processing device according to claim 1, wherein the imaging device includes a first imaging device that photographs an image from a same direction as a facing direction of the display device and a second imaging device that photographs an image from an opposite direction to the facing direction of the display device and is configured such that the user can select an imaging device to be used among the first imaging device and the second imaging device, and
the display manner of the guide changes according to the selected imaging device to be used.

16. The image processing device according to claim 3, wherein the imaging device includes a first imaging device that photographs an image from a same direction as a facing direction of the display device and a second imaging device that photographs an image from an opposite direction to the facing direction of the display device and is configured such that the user can select an imaging device to be used among the first imaging device and the second imaging device, and
the total imaging area includes an imaging area of the first imaging device and an imaging area of the second imaging device.

17. The image processing device according to claim 1, wherein
the processor is further configured to:
detect a face area of a person displayed on the display device, and
set a display location of the guide based on the face area detected by the processor.

18. The image processing device according to claim 1, wherein the processor is further configured to display the guide near a first imaging device that photographs an image from the same direction as a facing direction of the display device.

19. The image processing device according to claim 1, wherein the processor is further configured to display the guide at a higher visibility than the photographing subject until the imaging device is rotated by a predetermined degree of rotation.

20. The image processing device according to claim 1, wherein the processor is further configured to change the display manner of the guide according to the direction and the amount of the parallel shift of the imaging device.

21. An image processing device, comprising:
a display device configured to display a photographing subject;
an imaging device configured to photograph the photographing subject;
a first motion sensor configured to detect a rotational direction and a degree of rotation of the imaging device;
a processor electrically connected to the display device, the image device and the first motion sense and configured to:
display a guide on the display device, for photographing the photographing subject from different imaging directions as the guide indicates the rotational direction of the imaging device relative to a proper rotational direction for photographing a next image of the photographing subject, wherein display the guide on the display device further comprising changing a display manner of the guide according to the rotational direction and the degree of rotation of the imaging device,
display a supplementary guide simultaneously with the guide for reducing a change in a photographing position on the display device by notifying a deviation of the imaging device in a vertical direction and in a horizontal direction,
photograph the next image as the guide and the supplementary guide are vertically aligned in the vertical direction of the display device of the image processing device, wherein a communicating device is configured to be connectable to an external image compositing device that is provided outside the image processing device, and an image compositing device stitches together a plurality of images which comprises the next image obtained by photographing the photographing subject in the different imaging directions so as to generate a composite image, wherein the supplementary guide comprises a third image displayed such that a display location does not change according to the direction and the amount of a parallel shift of the imaging device and a fourth image displayed such that a display location changes according to the direction and the amount of the parallel shift of the imaging device.

22. An image processing device, comprising:
a communicating device that is configured to be connectable to an external display device configured to display a photographing subject and an external imaging device configured to photograph the photographing subject, in which the external display device and the external imaging device are provided outside the image processing device;

a processor electrically connected to the display device, the image device and the first motion sense and configured to:
> display a guide on the display device, for photographing the photographing subject from different imaging directions as the guide indicates the rotational direction of the imaging device relative to a proper rotational direction for photographing a next image of the photographing subject, wherein display the guide on the display device further comprising changing a display manner of the guide according to the rotational direction and the degree of rotation of the imaging device,
>
> display a supplementary guide simultaneously with the guide for reducing a change in a photographing position on the display device by notifying a deviation of the imaging device in a vertical direction and in a horizontal direction,
>
>> photograph the next image as the guide and the supplementary guide are vertically aligned in the vertical direction of the display device of the image processing device, and
>>
>> stitch together a plurality of images which comprises the next image obtained by photographing the photographing subject from the different imaging directions so as to generate a composite image, wherein the supplementary guide comprises a third image displayed such that a display location does not change according to the direction and the amount of a parallel shift of the imaging device and a fourth image displayed such that a display location changes according to the direction and the amount of the parallel shift of the imaging device.

23. A photographing assist equipment, comprising:
a fixing mechanism to which an image processing device is attachable; and
a rotation control mechanism configured to rotate the fixing mechanism,
wherein the image processing device comprises:
> a display device configured to display a photographing subject;
> an imaging device configured to photograph the photographing subject;
> a first motion sensor configured to detect a rotational direction and a degree of rotation of the imaging device; and
> a processor electrically connected to the display device, the image device and the first motion sense and configured to:
>> display a guide on the display device as the guide indicates the rotational direction of the imaging device relative to a proper rotational direction for photographing a next image of the photographing subject, wherein display the guide on the display device further comprising changing a display manner of the guide according to a rotational direction and a degree of rotation of the imaging device so as to indicate photographing the photographing subject from different imaging directions,
>>
>> display a supplementary guide simultaneously with the guide for reducing a change in a photographing position on the display device by notifying a deviation of the imaging device in a vertical direction and in a horizontal direction,
>>
>>> photograph the next image as the guide and the supplementary guide are vertically aligned in the vertical direction of the display device of the image processing device, and
>>>
>>> stitch together a plurality of images which comprises the next image obtained by photographing the photographing subject from the different imaging directions so as to generate a composite image, wherein the supplementary guide comprises a third image displayed such that a display location does not change according to the direction and the amount of a parallel shift of the imaging device and a fourth image displayed such that a display location changes according to the direction and the amount of the parallel shift of the imaging device.

24. An image processing method, comprising:
a displaying step of displaying a photographing subject on a display device;
a photographing step of photographing the photographing subject by means of an imaging device;
a guide display controlling step of displaying a guide on the display device, for photographing the photographing subject from different imaging directions as the guide indicates the rotational direction of the imaging device relative to a proper rotational direction for photographing a next image of the photographing subject, wherein displaying the guide on the display device further comprising changing a display manner of the guide according to a rotational direction and a degree of rotation of the imaging device, displaying a supplementary guide simultaneously with the guide for reducing a change in a photographing position on the display device by notifying a deviation of the imaging device in a vertical direction and in a horizontal direction,
photographing the next image as the guide and the supplementary guide are vertically aligned in the vertical direction of the display device; and
stitching together a plurality of images which comprises the next image obtained by photographing the photographing subject from the different imaging directions so as to generate a composite image, wherein the supplementary guide comprises a third image displayed such that a display location does not change according to the direction and the amount of a parallel shift of the imaging device and a fourth image displayed such that a display location changes according to the direction and the amount of the parallel shift of the imaging device.

25. A non-transitory computer readable recording medium storing an image processing program, in which the program makes a computer execute the steps of:
displaying a photographing subject on a display device;
photographing the photographing subject by means of an imaging device;
displaying a guide on the display device, for photographing the photographing subject from different imaging directions as the guide indicates the rotational direction of the imaging device relative to a proper rotational direction for photographing a next image of the photographing subject, wherein display the guide on the display device further comprising changing a display manner of the guide according to a rotational direction and a degree of rotation of the imaging device;
displaying a supplementary guide simultaneously with the guide for reducing a change in a photographing position on the display device by notifying a deviation of the imaging device in a vertical direction and in a horizontal direction;

photographing the next image as the guide and the supplementary guide are vertically aligned in the vertical direction of the display device; and stitching together a plurality of images which comprises the next image obtained by photographing the photographing subject from the different imaging directions so as to generate a composite image, wherein the supplementary guide comprises a third image displayed such that a display location does not change according to the direction and the amount of a parallel shift of the imaging device and a fourth image displayed such that a display location changes according to the direction and the amount of the parallel shift of the imaging device.

26. The image processing device according to claim 1, wherein the supplementary guide is displayed to rotate about the line as a rotation axis in response to the rotation of the imaging device.

27. The image processing device according to claim 1, wherein the guide is configured by arranging a plurality of guide units in a circular or elliptical arc shape.

28. The image processing device according to claim 27, wherein the processor determines a display position of a first marker with respect to the guide based on a rotational movement of the imaging device, and determines a display position of a second marker with respect to the supplementary guide based on the parallel shift of the imaging device.

\* \* \* \* \*